United States Patent
Usui et al.

(10) Patent No.: US 9,990,288 B2
(45) Date of Patent: Jun. 5, 2018

(54) INFORMATION PROCESSING DEVICE AND DATA STRUCTURE

(71) Applicant: Kabushiki Kaisha Toshiba, Minato-ku, Tokyo (JP)

(72) Inventors: Hiroyuki Usui, Pittsburgh, PA (US); Seiji Maeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 744 days.

(21) Appl. No.: 14/484,093

(22) Filed: Sep. 11, 2014

(65) Prior Publication Data

US 2015/0261675 A1    Sep. 17, 2015

(30) Foreign Application Priority Data

Mar. 13, 2014  (JP) ................. 2014-050584

(51) Int. Cl.
  *G06F 12/08*    (2016.01)
  *G06F 12/0813*  (2016.01)

(52) U.S. Cl.
  CPC .... *G06F 12/0813* (2013.01); *G06F 2212/154* (2013.01); *G06F 2212/305* (2013.01)

(58) Field of Classification Search
  CPC .......... G06F 12/0813; G06F 2212/154; G06F 2212/305
  See application file for complete search history.

(56) References Cited

U.S. PATENT DOCUMENTS

| | | | |
|---|---|---|---|
| 5,991,847 A | 11/1999 | Ballard et al. | |
| 6,490,654 B2 | 12/2002 | Wickeraad et al. | |
| 6,754,776 B2 | 6/2004 | Conway et al. | |
| 7,853,775 B2 | 12/2010 | Kyo | |
| 8,051,273 B2 | 11/2011 | Kyo | |
| 8,078,803 B2 | 12/2011 | Speier et al. | |

(Continued)

FOREIGN PATENT DOCUMENTS

| | | |
|---|---|---|
| JP | 53-064439 A | 6/1978 |
| JP | 07-095307 B | 10/1995 |

OTHER PUBLICATIONS

U.S. Appl. No. 14/931,724, filed Nov. 3, 2015, Maeda.

(Continued)

*Primary Examiner* — Aracelis Ruiz
(74) *Attorney, Agent, or Firm* — Knobbe, Martens, Olson & Bear, LLP

(57) ABSTRACT

An information processing device of an embodiment has an input unit, a storage unit, a read control unit, and a write control unit. A read request and a write request are input to the input unit. The storage unit stores management information. When the read request is input, the read control unit reads read data including the management information from the storage unit, references the management information, and outputs only non-zero data included in a predetermined range of a block row. The write control unit writes only non-zero data to the storage unit and updates the management information immediately before a start position of the continuous non-zero data started from a largest position in the continuous non-zero data started from a position smaller than the predetermined range, a last management information stored in the predetermined range, and the last management information in the predetermined range.

15 Claims, 18 Drawing Sheets

(56) References Cited

U.S. PATENT DOCUMENTS

| | | |
|---|---|---|
| 8,112,613 B2 | 2/2012 | Kyo |
| 8,200,735 B2 | 6/2012 | Inoue |
| 8,291,194 B2 | 10/2012 | Tsai et al. |
| 8,386,716 B2 | 2/2013 | Speier et al. |
| 2004/0030847 A1* | 2/2004 | Tremaine ............... G06F 12/023 711/154 |
| 2004/0049641 A1 | 3/2004 | So et al. |
| 2005/0160228 A1 | 7/2005 | Teruyama |
| 2005/0223127 A1* | 10/2005 | Boutcher ................ G06F 13/28 711/212 |
| 2006/0143396 A1 | 6/2006 | Cabot |
| 2012/0109897 A1* | 5/2012 | Janakiraman ....... G06F 11/1466 707/660 |
| 2012/0144130 A1* | 6/2012 | Fossum ................... G06F 17/16 711/154 |
| 2013/0166519 A1 | 6/2013 | Matsuse |

OTHER PUBLICATIONS

U.S. Appl. No. 14/641,827, filed Mar. 9, 2015, Maeda.
David A. Patterson, et al., "Computer Organization and Design," Aug. 16, 2004, Third Edition, pp. 549-579.

\* cited by examiner

FIG. 2

INFORMATION PROCESSING DEVICE AND DATA STRUCTURE

CROSS REFERENCE TO RELATED APPLICATION

This application is based upon and claims the benefit of priority from the prior Japanese Patent Application No. 2014-050584 filed on Mar. 13, 2014, the entire contents of which are incorporated herein by reference.

FIELD

An embodiment described herein relates generally to an information processing device and a data structure.

BACKGROUND

Conventionally, there has been a demand for a sparse matrix having most of matrix elements which are 0 to suppress the used amount and the band width of a memory by retaining only non-zero components in the memory. Today, the demand is realized by managing only the values of the non-zero components and the position information thereof to suppress the used amount and the band width of the memory by using a sparse-matrix management library of software.

However, since these processes depend on the software, a large overhead is present upon access to the non-zero components. Moreover, upon access to the sparse matrix, massive time is taken if access according to data management methods of respective libraries is not used. Therefore, access cannot be made like that for a matrix formed by a normal two-dimensional layout, which is inconvenient. Conventionally, there has been hardware that carries out management so as to retain only non-zero components in a DRAM; however, there is a problem that processing upon rewrite is complex and has a large overhead.

On the other hand, generally, the processing speed of a processor or a hardware engine is higher than the data supply ability of a main memory such as a DRAM; therefore, a cache memory which compensates for the performance difference thereof is used in some cases. The cache memory is a memory such as a SRAM which exhibits a higher speed than the main memory, and the cache memory temporarily stores data in a data array. The processor can carry out high-speed processing by accessing the data in the cache memory.

If there are no data in the data array, the cache memory acquires data from the main memory in the unit of a cache line size (for example, 256 bytes) larger than an accessed data size. By accessing the main memory in the large unit, efficiency of the access to the main memory is improved. On the other hand, in a case in which data are in the data array, the cache memory can return data from the data array without acquisition of data from the main memory; therefore, the processor or the hardware engine can access the data at high speed.

BRIEF DESCRIPTION OF THE DRAWINGS

FIG. 2 is a diagram for explaining a matrix to be processed in the present embodiment;

FIG. 10 is a diagram for explaining a detailed configuration of Read Ctrl 23a;

FIG. 13 is a diagram for explaining a detailed configuration of Write Ctrl 24a;

FIG. 19 is a diagram for explaining a write operation by Write Ctrl 24a; and

FIG. 20 is a diagram for explaining a write operation by Write Ctrl 24a.

DETAILED DESCRIPTION

An information processing device of an embodiment has an input unit, a storage unit, a read control unit, and a write control unit. A read request and a write request with respect to a predetermined range of a block row provided with at least one or more blocks consisting of one or more elements are input to the input unit. The storage unit stores, in the region of zero data having all the elements in one block being zero, management information, which stores information representing the number of continuous non-zero data having one or more non-zero elements in one block and a distance to next non-zero data. When the read request is input, the read control unit reads read data including the management information from the storage unit, references the management information, and outputs only non-zero data included in a predetermined range of a block row. The write control unit writes only non-zero data, which has one or more non-zero elements in one block in the data, to the storage unit and updates the management information immediately before a start position of the continuous non-zero data started from a largest position in the continuous non-zero data started from a position smaller than the predetermined range, a last management information stored in the predetermined range, and the last management information in the predetermined range.

Hereinafter, an embodiment of the present invention will be explained in detail with reference to drawings.

Figure 1:
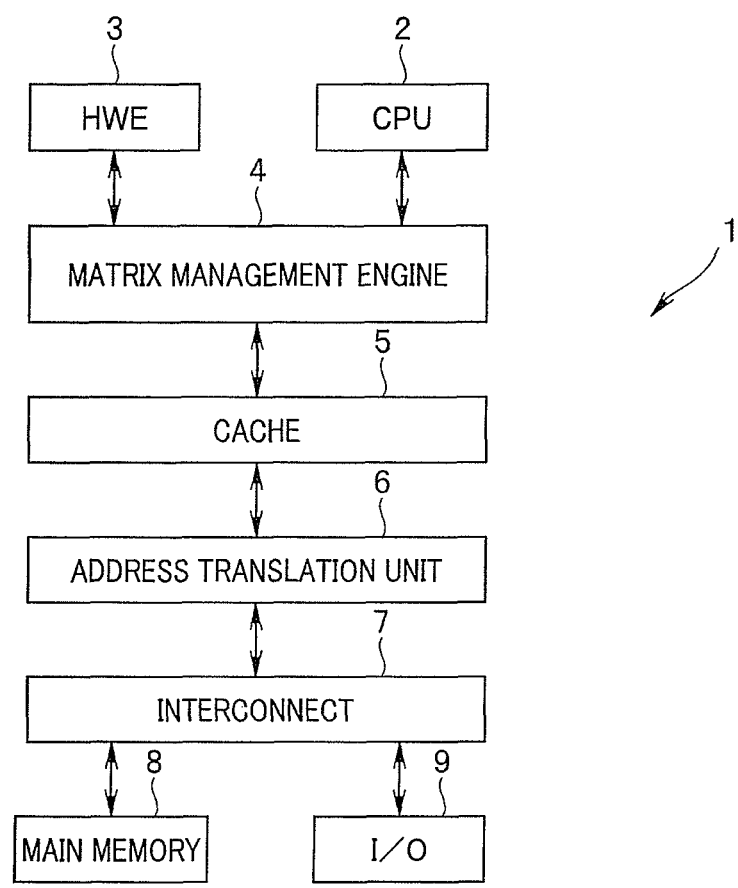
FIG. 1 is a diagram showing a configuration of a computer system provided with an information processing device according to the present embodiment.

A computer system provided with an information processing device according to the present embodiment will be explained. FIG. 1 is a configuration diagram of the computer system provided with the information processing device according to the present embodiment. The computer system 1 consists of a central processing unit (hereinafter, referred to as CPU) 2, a hardware engine (hereinafter, referred to as HWE) 3, a matrix management engine 4, a cache 5, an address translation unit 6, an interconnect 7, a main memory 8, and an input/output device (hereinafter, referred to as I/O) 9.

The matrix management engine 4 serving as the information processing device is connected to the CPU 2, the HWE 3, and the cache 5. The cache 5 is connected to the interconnect 7 via the address translation unit 6. The interconnect 7 is further connected to the main memory 8 and the I/O 9. The main memory 8 is, for example, a DRAM.

Input data to the computer system 1 is transferred to the main memory 8 via the I/O 9 and the interconnect 7. The transferred input data is transferred to and processed by the CPU 2 or the HWE 3. Output data processed by the CPU 2 or the HWE 3 is output via the main memory 8, the interconnect 7, and the I/O 9.

In a case in which data other than that of a matrix is accessed, the computer system 1 directly accesses the main memory 8 (or the cache 5) from the CPU 2 or the HWE 3 without the intermediation of the matrix management engine 4. On the other hand, in a case in which a matrix is accessed, the matrix management engine 4 carries out processing.

Figure 2:
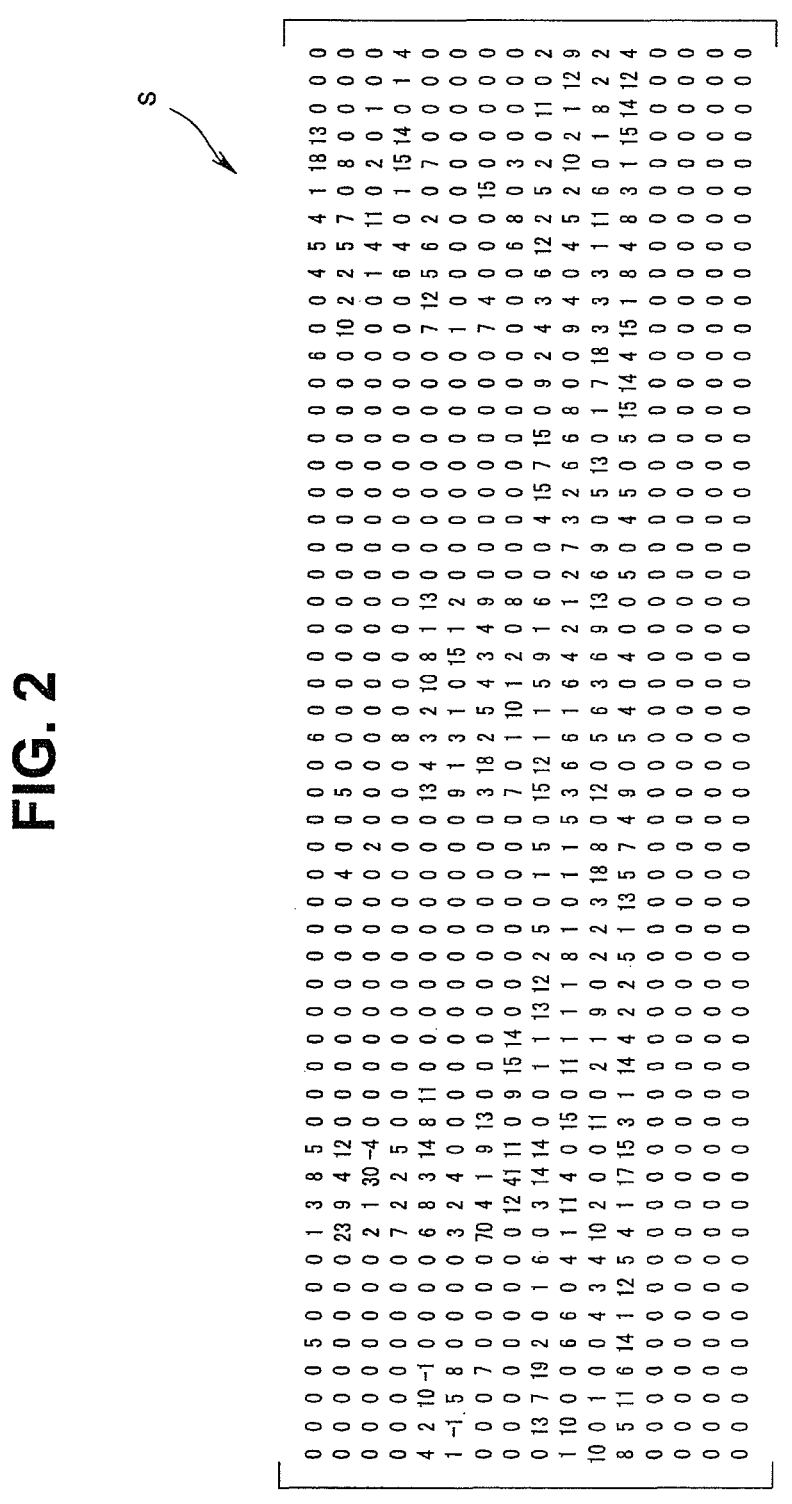
Figure 3:
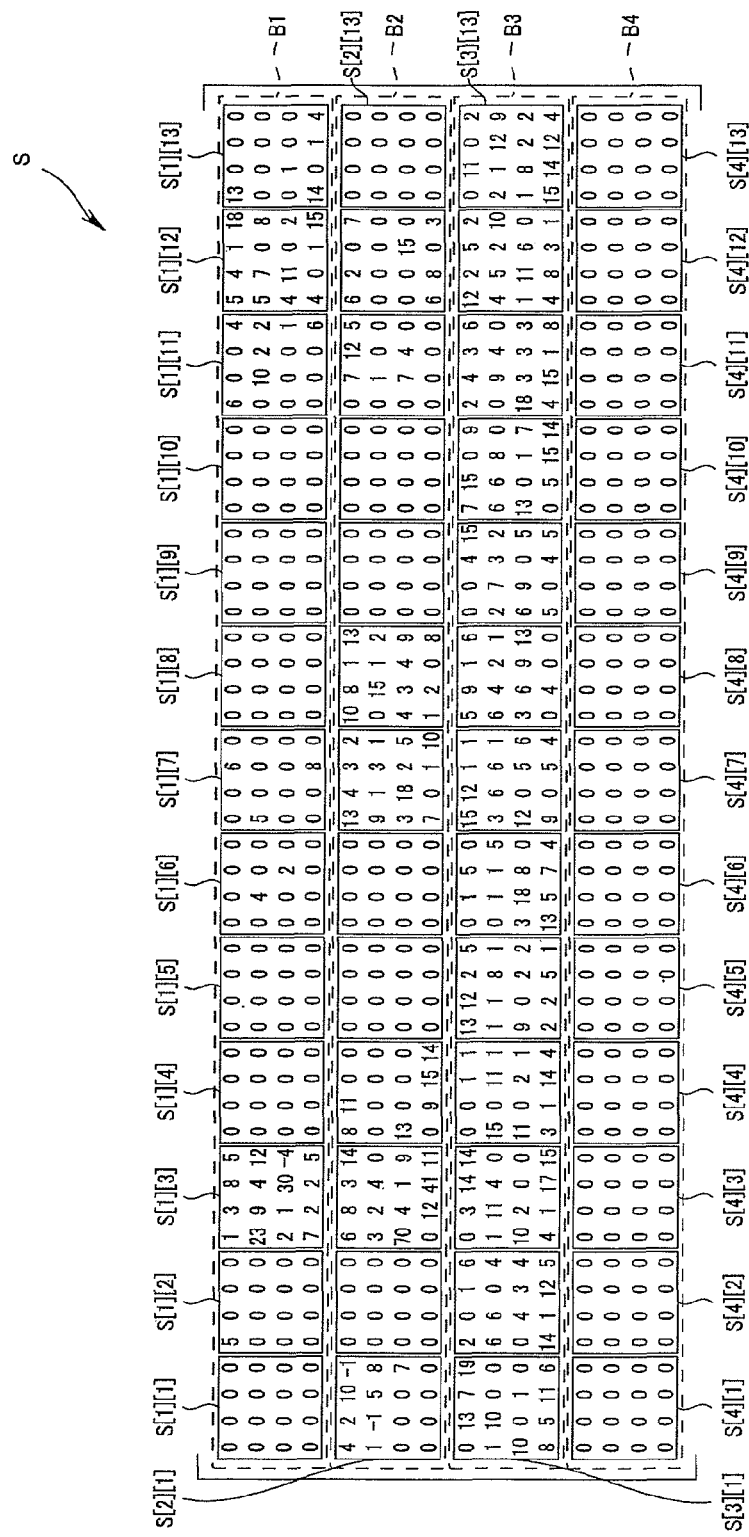
FIG. 3 is a diagram for explaining a processing unit of the matrix.

An example of a matrix processed in the present embodiment will be explained. FIG. 2 is a diagram for explaining a matrix processed in the present embodiment, and FIG. 3 is a diagram for explaining processing units of the matrix.

The matrix of FIG. 2 is a two-dimensional sparse matrix S consists of 832 elements of 16 rows and 52 columns. Moreover, in the present embodiment, zeros/non-zeros are managed by a predetermined size of the sparse matrix S. The predetermined size is one or more elements and is, for example, a 16-element unit of 4×4 as shown in FIG. 3. This unit is referred to as a block. The block of 4×4 in the sparse matrix S is expressed as S[y][x] (x=1 to 13, y=1 to 4). The block number in the horizontal (column) direction is represented by x, and x is in the range of 1 to the number obtained by dividing the number of the columns of the sparse matrix S by 4 (rounded up). The block number in the vertical (row) direction is y, and y is in the range of 1 to the number obtained by dividing the number of the rows of the sparse matrix S by 4 (rounded up).

Herein, as the definitions of the zero/non-zero of the block unit, a case in which all the elements of one block are 0 is zero, and a case in which one block includes at least one element that is not 0 is non-zero. For example, S[1][1] and S[1][4] are zero since all the 16 elements therein are 0. On the other hand, a case in which at least one of 16 elements is not 0 like S[1][2] and a case in which all of 16 elements are not 0 like S[1][3] are non-zero.

In the present embodiment, non-zero management is carried out in a block row unit. Note that even if the sparse matrix S is a matrix of three or more dimensions, management can be similarly carried out by carrying out management in a one-dimensional block row unit. In the present embodiment, as shown in FIG. 3, non-zero management is carried out while using S[1][1] to S[1][13] as one block row B1. Non-zero management is similarly carried out for each of the other block rows B2, B3, and B4.

Figure 4:
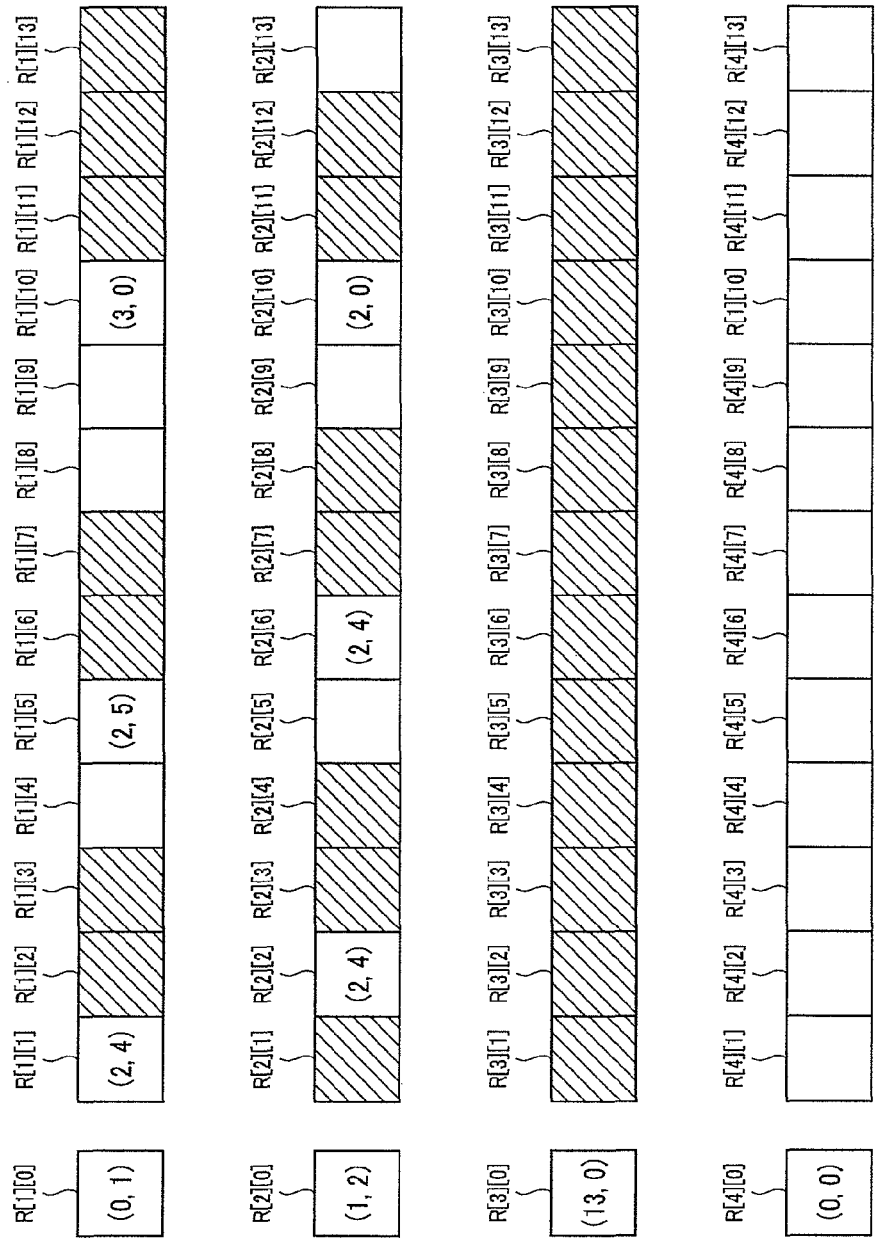
FIG. 4 is a diagram for explaining a management method of block rows.

FIG. 4 is a diagram for explaining a management method of block rows. In non-zero management of a block row, a memory region corresponding to one block (hereinafter, referred to as a non-zero management region) different from that for matrix data is used and disposed at a top of the block row. Hereinafter, a block position in the non-zero management is expressed as R[y][x]. The block number in the horizontal (column) direction is x, and the block number in the vertical (row) direction is y. FIG. 4 shows R[y][x] (x=0 to 13, y=1 to 4). The block row B1 uses R[1][0] to R[1][13].

Non-zero data is disposed so that the position thereof in the sparse matrix S and the position thereof among the block positions R are the same. For example, S[1][2] which is non-zero data in the sparse matrix S is disposed at R[1][2], and S[1][6] is disposed at R[1][6].

Then, position information of the non-zero data (hereinafter, referred to as non-zero management information) is disposed at the position of zero data. More specifically, the non-zero management information is disposed at the position of the zero data immediately before one or more continuous non-zero data. Note that, in the present embodiment, one piece of non-zero management information is recorded at the position of the zero data immediately before continuous non-zero data, wherein the position information of a plurality of non-zero data may be configured to be disposed at the position of one zero data.

The non-zero management information consists of parameters (Num, Next). The number of blocks of continuous non-zero data is represented by Num, and the distance (the number of blocks) to next non-zero data is represented by Next. However, a case in which Next is 0 represents that next continuous non-zero data is not present in the block row. Note that, although the non-zero management information uses relative distances in FIG. 4, absolute coordinates (block positions x) may be used.

For example, the non-zero management information of the column of the non-zero data starting from S[1][2] of FIG. 4 is disposed at R[1][1], which is zero data. Num is 2 since R[1][2] and R[1][3] are non-zero. Moreover, since the column of next non-zero data is started from R[1][6], Next becomes 4 (=6−2). Thus, the non-zero management information stored at R[1][1] becomes (2, 4).

At the non-zero management region R[1][0] additionally ensured by the amount corresponding to one block column, the non-zero management information about the data from the row head R[1] [1] is recorded. For example, since the row head R[1][1] is zero data in the block row B1, Num of R[1] [0] becomes 0, and Next becomes the distance 1 (=2−1) to the non-zero data starting from R[1][2].

On the other hand, since R[2][1] is non-zero data in the block row B2, Num of R[2] [0] becomes the number of the non-zero data from R[2][1]. Namely, Num of the non-zero management region R[2][0] of the block row B2 becomes 1, and Next becomes the distance 2 (=3−1) to the next non-zero data.

Moreover, in a case in which all of block rows are non-zero like the block row B3, the data of a non-zero management region R[3][0] becomes (13, 0). On the other hand, in a case in which all of block rows are zero like the block row B4, the data of a non-zero management region R[4] [0] becomes (0, 0).

The matrix management engine 4 has matrix management information for each of matrices managed. The matrix management information is a matrix base address (base), the number of rows of the matrix (width), and the number of columns of the matrix (height) and is set from outside (for example, the CPU 2). Herein, it is assumed that address space has a 32-bit width in a byte address, one element of the sparse matrix S is 8-byte data, and the base address thereof is 0x48000000. In this case, set values of parameters become 0x48000000 as the matrix base address (base), 52 as the number of rows of the matrix (width), and 16 as the number of columns of the matrix (height). The matrix management engine 4 uses memory space by using these parameters.

Figure 5:
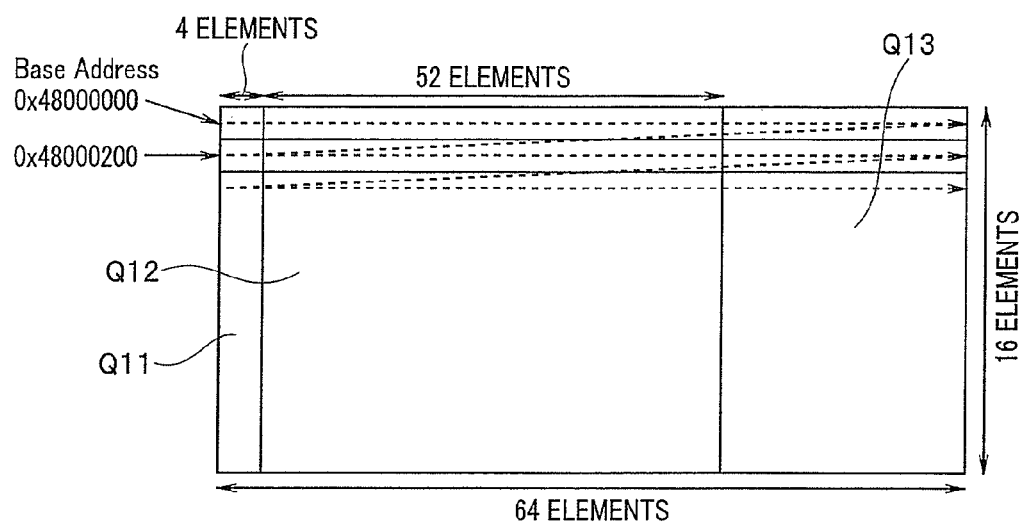
FIG. 5 is a diagram for explaining an example of used memory space.

FIG. 5 is a diagram for explaining an example of the used memory space. The number of elements of one line is $2^n$ (n is an integer 1 or higher) including a non-zero management region and row data of the matrix. The matrix data are sequentially disposed one row by one row in a line direction. In the data of a first row, a non-zero management region Q11 (corresponding to 4 elements) and row data Q12 of the matrix (corresponding to 52 elements) are disposed from Base Address (0x48000000). The width of the non-zero management region Q11 corresponds to the width of the columns of one block, which is a zero/non-zero management unit.

Note that a region corresponding to 8 elements is a data region Q13, which is not used. The width Z of the data region Q13, which is not used, is a minimum value that satisfies a below equation.

(Z+[the width of the management region $Q11$]+[the number of elements of the row data $Q12$])=$2^n$
($n$ is a positive integer,$n >= 1$), and $Z >= 0$ In FIG. 5, the value of Z is 8, and the size of one line corresponds to 64 elements. Since a memory volume of one line is 512 bytes (64 elements×8 bytes), the data of a second row is started from an address 0x48000200.

Figure 6:
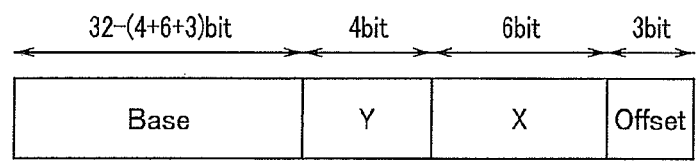
FIG. 6 is a diagram for explaining an example of a bit layout in matrix addresses.

FIG. 6 is a diagram for explaining an example of a bit layout of a matrix address (address before translation). The matrix address includes Base Address, a Y-coordinate, an X-coordinate, and Offset used when the data (8 bytes) of one element are accessed in a byte unit. If the elements on which the sparse matrix S is present are s(y,x) (x=1 to 52, y=1 to 16), the address at which the elements are disposed is X=x+3 and Y=y−1. For example, the address in a case of S(1,1) is 0x48000020 since X=4 and Y=0, and the address in a case of S(5,25) is 0x480008e0 since X=28 and Y=4.

Figure 7:
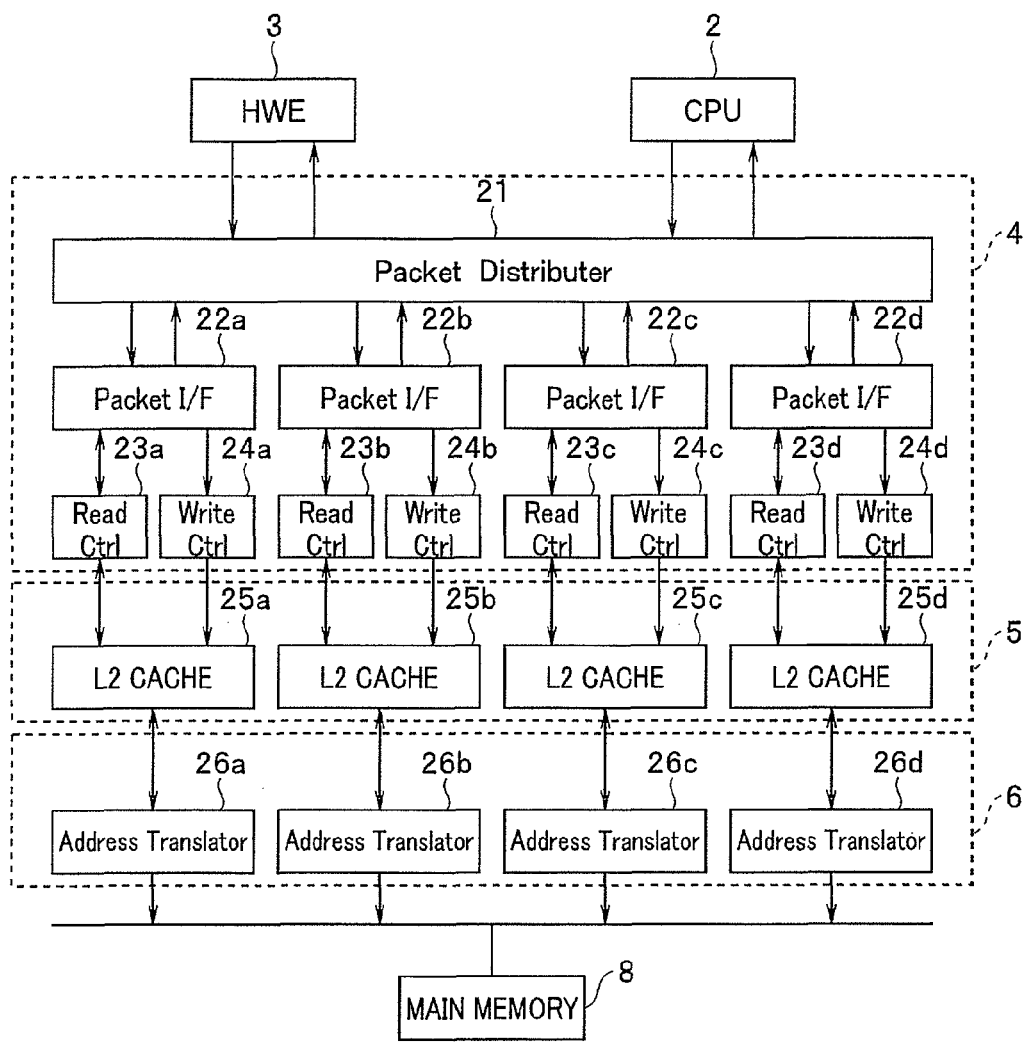
FIG. 7 is a diagram for explaining a detailed configuration of a matrix management engine 4.

Next, the matrix management engine 4 will be explained. FIG. 7 is a configuration diagram of the matrix management engine 4. The matrix management engine 4 of FIG. 7 is provided with a Packet Distributer 21, Packet I/Fs 22a to 22d, Read Ctrls 23a to 23d, and Write Ctrls 24a to 24d. Note that the matrix management engine 4 of FIG. 7 has four Packet I/Fs 22a to 22d, wherein the number thereof is arbitrary, and the matrix management engine 4 has Read Ctrls 23 and Write Ctrls 24 to correspond thereto. Moreover, the cache 5 consists of L2 caches 25a to 25d. Furthermore, the address translation unit 6 consists of Address Translators 26a to 26d corresponding to the L2 caches 25a to 25d, respectively. Note that the L2 caches 25 may be general caches.

Input from the master module (the CPU 2 or the HWE 3) is input to Packet Distributer 21. The relation of input/output between the matrix management engine 4 and the master module is as described below. Requests from the master module are carried out in block units.

In a case of a read request from the HWE 3, the start address of an access target matrix, an X-coordinate and a Y-coordinate of access start, the number of transfer columns, and the number of transfer rows are input to the matrix management engine 4. Note that these parameters are examples. For example, in a case of access in one row, the parameters may be parameters such as an access start element address and the number of transfers. In that case, according to the access start element address, the other parameters are calculated in the matrix management engine 4.

With respect to a read request from the HWE 3, in a case in which non-zero data are in a target read region, the matrix management engine 4 outputs continuous non-zero data columns as below read data. The read data include an X-coordinate and a Y-coordinate of the start of the non-zero data, the continuous non-zero data columns, and a non-zero data flag (ON). Note that in a case in which all data are zero with no non-zero data column, the non-zero data flag becomes OFF, and nothing is output as the X-coordinate and the Y-coordinate of the start of read non-zero data and non-zero data columns.

Moreover, in a case of a write request from the HWE 3, the start address of an access target matrix, an X-coordinate and a Y-coordinate of access start, the number of transfer columns, the number of transfer rows, and a non-zero data flag are input to the matrix management engine 4.

In a case in which non-zero data are written, the non-zero data flag becomes ON. Data input in the case in which the non-zero data are written are an X-coordinate and a Y-coordinate of the start of non-zero data for every continuous non-zero data columns, the continuous non-zero data columns, and a terminal flag of the continuous non-zero data columns. Then, a last non-zero data flag of the write request is attached to the ending thereof.

The write request from the HWE 3 writes zero data to a location for which any non-zero data column is specified in a write request range. In a case in which zero data are written all in the request range, the non-zero data flag becomes OFF, and matrix data are not input from the HWE 3 to the matrix management engine 4.

On the other hand, a read request from the CPU 2 is the same as a normal read request from a CPU to a memory. The address and the read size of a read access target are input to the matrix management engine 4.

With respect to the read request from the CPU 2, the matrix management engine 4 returns read data of the requested read size to the CPU 2. In a case in which the requested read size is smaller than a block size or is not an integral multiple of a block size, the matrix management engine 4 processes the request as a read request of a size that is larger than the requested read size and is minimum among block sizes of the integral multiples. Then, the matrix management engine 4 returns only the read size actually requested from the obtained read data to the CPU 2. Moreover, in a case in which the read data include 0, the matrix management engine 4 returns 0 to the CPU 2.

Moreover, a write request from the CPU 2 is the same as a normal write request from a CPU to a memory. The address of a write access target, a write size, and write data are input to the matrix management engine 4.

With respect to the write request from the CPU 2, the matrix management engine 4 stores the write data of the requested write size. In a case in which the write size is smaller than a block size or is not an integral multiple of the block size, the matrix management engine 4 carries out processing while considering that the data other than the given write data are 0, wherein the request serves as a write request of a size that is larger than the write size and is minimum among the block sizes of the integral multiples.

The matrix management engine 4 has matrix information therein and, when access is input, judges whether it is access to a management matrix. In a case in which it is judged that the access is not to the management matrix, the matrix management engine 4 accesses the L2 cache 25, etc. as normal access.

In a case in which only non-zero data are output to a request source, Read Ctrl 23 outputs the non-zero data read from the L2 cache 25 and the position information thereof to the request source. On the other hand, in a case of output to the request source as normal matrix data, Read Ctrl 23 outputs the normal matrix data into which zero data have been inserted to the request source based on the non-zero data read from the L2 cache 25 and the position information thereof.

In both of the case in which only the non-zero data and the position information are input and the case in which the normal matrix data are input, Write Ctrl 24 translates the access to below two requests and outputs the requests to the L2 cache 25. Specifically, Write Ctrl 24 translates the access to the request for carrying out write of the non-zero data and update of the position information and to the request for carrying out update of the position information by translation from non-zero to zero (write of data is not carried out).

With respect to a request from the master module, Packet Distributer 21 checks whether it is access to a read/write-requested matrix, the address of which is managed. Then, in the case of the managed matrix, Packet Distributer 21 carries out address translation, judges whether it is access to the cache 5, and distributes the request to the Packet I/Fs 22a to 22d for each row. In a case in which it is not the access to the managed matrix, Packet Distributer 21 returns an error to the master module.

In order to check whether it is the access to the managed matrix, Packet Distributer 21 uses the matrix management parameters (base, width, height) and checks whether the address space of the memory includes the requested address.

In a case in which it is judged to be the access to the managed matrix, Packet Distributer 21 carries out address translation and disposes non-zero-managed blocks, which have been disposed at addresses away from each other by each row in the original address space, in continuous address space.

Figure 8:
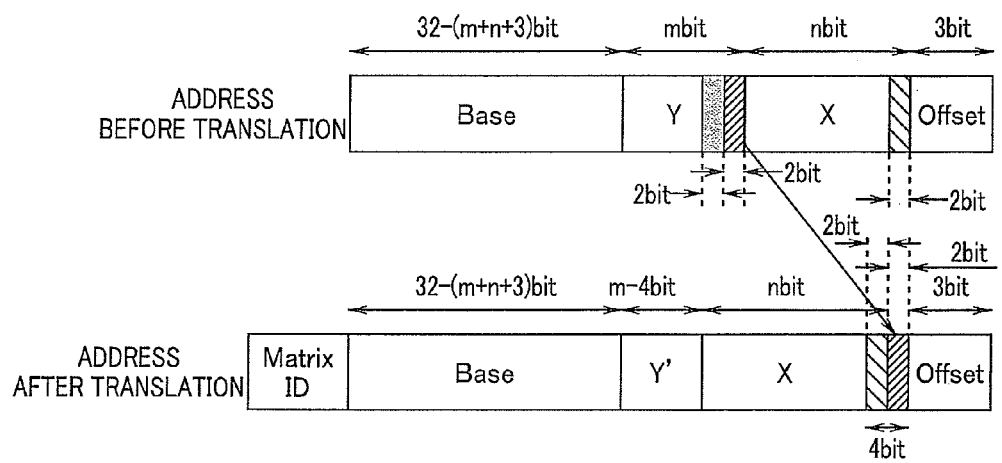
FIG. 8 is a diagram for explaining a process of address translation.

Herein, FIG. 8 is a diagram for explaining the process of the address translation. In a case in which the management unit is a 4×4 block, lower 2 bits of X and Y represent the position in the block. Therefore, Packet Distributer 21 inserts the lower 2 bits of Y of the address before translation into the lower side of X of the address after translation. Note that also in a case in which the matrix has three or more dimensions, the bit(s) representing the position in the block except that of X is moved to the lower side of X. The bit positions of X and Y can be calculated from width of the input parameters. Moreover, Packet Distributer 21 adds MatrixID, which represents a managed matrix, to the address after translation.

Moreover, Packet Distributer 21 confirms an L2 bank number of the address before translation. In the present embodiment, banks, in other words, the L2 caches 25a to 25d are switched for each block row of the non-zero management matrix. Therefore, the 2 bits at the position shown by shading of Y of the address before translation represents the L2 bank number. Packet Distributer 21 outputs a request to any of the L2 caches 25a to 25d represented by the value of the 2 bits. Note that the 2 bits representing the L2 bank number are not included in the address after translation. Output parameters are translated from the input parameters and include a base address of an access target row, an access-start X-coordinate, and the number of accesses. Note that only in a case of a write request, the parameters include a flag representing write of all 0.

In the case of the write request, write data are separately input, and Packet Distributer 21 carries out translation from the input write data to a start X-coordinate of write non-zero data, continuous non-zero data columns, a terminal flag (Flag-tail) of the continuous non-zero data columns, and a non-zero data flag (Flag-end) in the end of the write request and outputs them.

Figure 9:
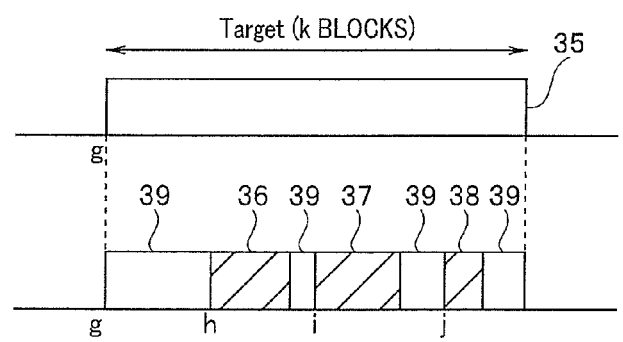
FIG. 9 is a diagram for explaining an example of a write request.

FIG. 9 is a diagram for explaining an example of the write request. A write target 35 corresponds to k blocks from a start address g. However, actually transferred write data are only non-zero regions 36, 37, and 38. Regions 39 other than that are handled as requests for writing 0. In the non-zero data at the end of the non-zero regions 36, 37, and 38, the terminal flags (Flag-tail) of the continuous non-zero data columns become 1; and, in the non-zero data in the end of the non-zero region 38, the non-zero data flag (Flag-end) in the end of the write request becomes 1.

Based on the read/write requests from Packet Distributer 21, the Packet I/Fs 22a to 22d distribute input data to Read Ctrls 23a to 23d or Write Ctrls 24a to 24d.

In accordance with the read requests, Read Ctrls 23a to 23d respectively access L2 data management structures in the L2 caches 25a to 25d and output the non-zero data included in access ranges to the Packet I/Fs 22a to 22d. Moreover, Read Ctrls 23a to 23d may acquire non-zero data and non-zero management information directly from the main memory 8 without using the L2 caches 25a to 25d.

Output data include a start X-coordinate of read non-zero data, continuous non-zero data columns, a terminal flag (Flag-tail) of the continuous non-zero data columns, a non-zero data flag (Flag-end) in the end of the read request, and the non-zero data flag.

Read Ctrls 23a to 23d output only the non-zero data in the non-zero regions. Namely, the data columns of zero data are not output. In a case in which there is at least one non-zero data, Read Ctrl 23 sets 1 as the non-zero data flag. On the other hand, in a case in which not even one non-zero data is included in the read request range, Read Ctrl 23 returns only the non-zero data flag 0.

The data output from Read Ctrls 23a to 23d are input to Packet Distributer 21 via the Packet I/Fs 22a to 22d. Packet Distributer 21 outputs data in accordance with a read data I/F for the master module.

On the other hand, in accordance with write requests, Write Ctrls 24a to 24d respectively access the L2 data management structures on the L2 caches 25a to 25d and update non-zero data and non-zero management information. Moreover, Write Ctrls 24a to 24d may keep non-zero data and non-zero management information directly in the main memory 8 without using the L2 caches 25a to 25d.

When the L2 cache 25, Read Ctrl 23, or Write Ctrl 24 is to access the main memory 8, Address Translators 26a to 26d reference the matrix management information and carry out address translation. In the address translation, reverse translation of the translation carried out by Packet Distributer 21 is carried out.

As a result of the address translation of Address Translators 26a to 26d, the data of one block disposed in one continuous region in the L2 caches 25a to 25d are divided into continuous regions of respective rows in the main memory 8 and accessed. Note that the L2 cache 25, Read Ctrl 23, or Write Ctrl 24 may directly access the main memory 8 without using the address translation by Address Translator 26.

Figure 10:
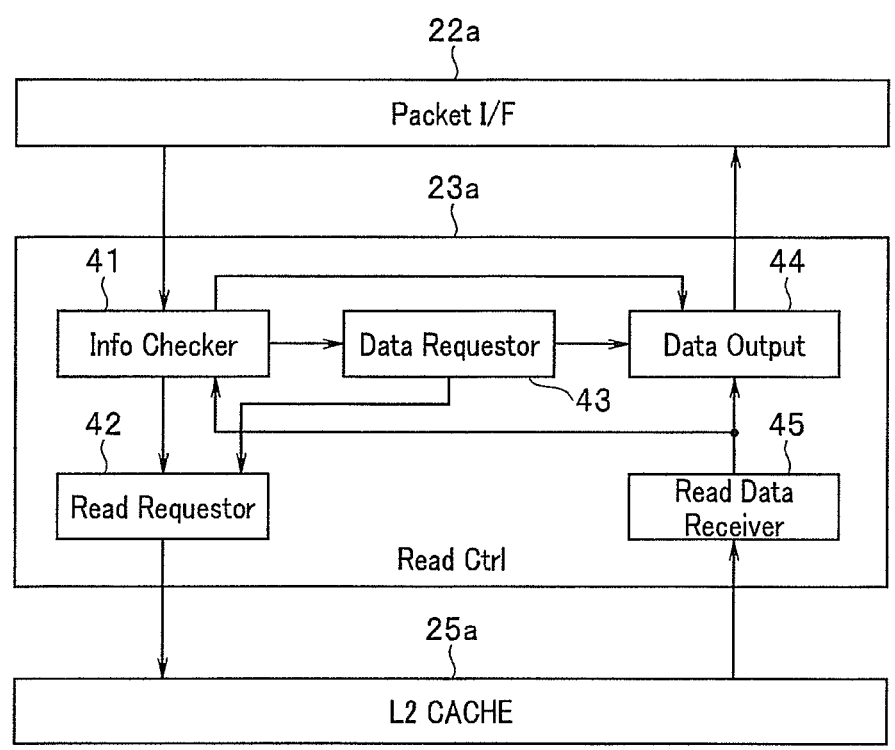

Herein, a read operation of Read Ctrl 23 will be explained. Note that, since Read Ctrls 23a to 23d have similar configurations, only Read Ctrl 23a will be explained. FIG. 10 is a configuration diagram of Read Ctrl 23a. Read Ctrl 23a has Info Checker 41, Read Requestor 42, Data Requestor 43, Data Output 44, and Read Data Receiver 45.

When a read request is input from the Packet I/F 22a, Info Checker 41 carries out read of non-zero management information and check of contents.

Info Checker 41 outputs the read request of the non-zero management information to Read Requestor 42. In accordance with the read request of the non-zero management information, Read Requestor 42 outputs a read request of a block, which includes the non-zero management information, to the L2 cache 25a. In accordance with the read request of the block, read data are read from the L2 cache 25a and input to Read Data Receive 45. Read Data Receiver 45 reads the non-zero management information from the read data and outputs that to Info Checker 41.

When Info Checker 41 detects a non-zero column of a read target in accordance with the non-zero management information, Info Checker 41 outputs the coordinates of the non-zero column and a read start request to Data Requestor 43. Moreover, Info Checker 41 outputs the start position of non-zero data to Data Output 44.

Data Requestor 43 outputs a read start coordinate of the non-zero column to Data Output 44 and outputs a read request of a non-zero block(s) included in the read region to Read Requestor 42. Then, in accordance with the read request of the non-zero block, Read Requestor 42 outputs a read request to the L2 cache 25a in accordance with the read request of the non-zero block. In accordance with the read request of the non-zero block, the read data are read from the L2 cache 25a and input to Data Output 44 via Read Data Receiver 45.

Data Output 44 outputs a header by using the start position of the non-zero data from Info Checker 41. Moreover, Data Output 44 outputs the read data, which are input from Read Data Receiver 45, to the Packet I/F 22a.

When the read request of the continuous non-zero blocks is finished, Data Requestor 43 outputs an end flag to Data Output 44. When the end flag is input, Data Output 44 outputs the terminal flag (Flag-tail) of the continuous zero-data columns. In a case in which there are a plurality of continuous non-zero blocks, Info Checker 41 outputs a read request of non-zero management information again to Read Requestor 42, and the above described operation is carried out.

Moreover, when read in the target read region is finished, Info Checker 41 outputs an end signal to Data Output 44. When the end signal is input, Data Output 44 outputs a non-zero data flag (Flag-end) in the end of the read request, and the read operation is finished.

Next, operations of the matrix management engine 4 configured in this manner will be explained.

Figure 11:
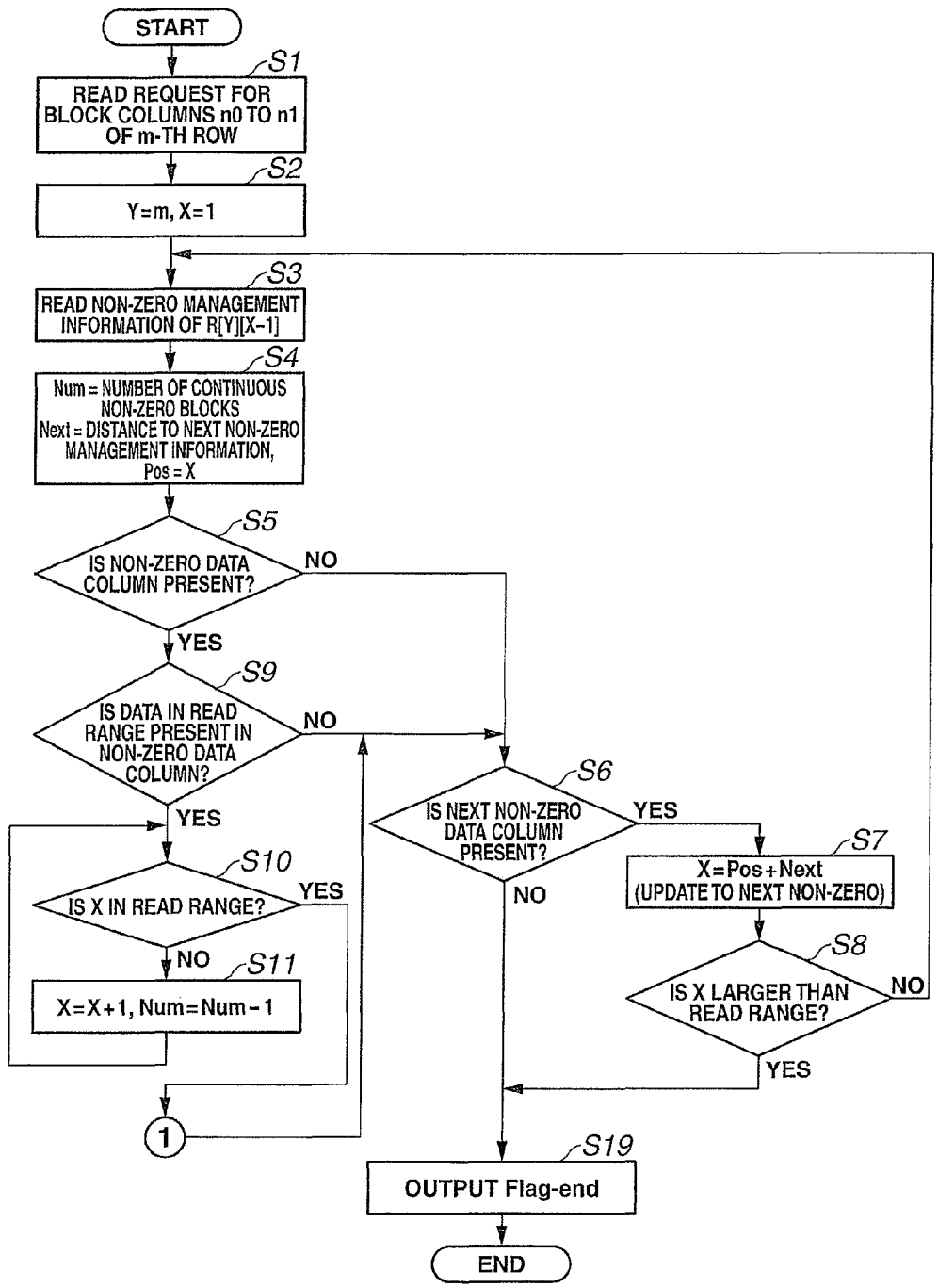
FIG. 11 is a flowchart for explaining an example of the flow of a process of reading data of S[m][n0] to S[m][n1]
Figure 12:
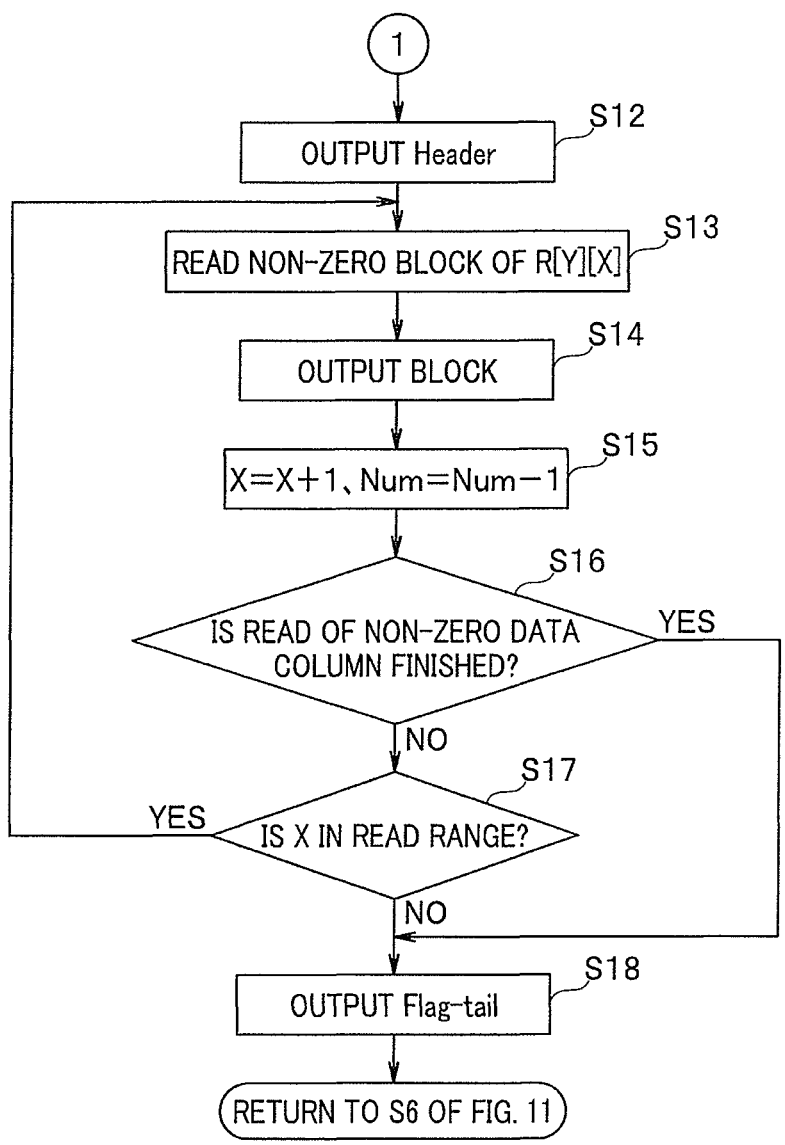
FIG. 12 is a flowchart for explaining an example of the flow of a process of reading data of S[m][n0] to S[m][n1]

An example of the process of a case of a read request will be explained by using FIG. 11 and FIG. 12. FIG. 11 and FIG. 12 are flowcharts for explaining the process of reading data of S[m][n0] to S[m][n1].

First, when the read request to the block columns n0 to n1 of an m-th row is input (S1), Read Ctrl 23a sets Y=m and X=1 (S2). Then, Read Ctrl 23a reads the non-zero management information of R[Y][X−1] (S3). Namely, in S3, the non-zero management information at the position immediately before the block represented by X and Y is read. Then, the values of the read non-zero management information are set as Num (the number of continuous non-zero blocks) and Next (the distance to next non-zero management information), and the current value of X is saved in Pos (S4).

Next, Read Ctrl 23a judges whether a non-zero data column(s) is present (S5). In a case in which it is judged that no non-zero data column is present (S5—NO), that is, a case of Num=0, Read Ctrl 23a judges whether a next non-zero data column is present (S6). In a case in which it is judged that the non-zero data column is present thereafter (S6—YES), update to X=Pos+Next is carried out (S7). Updated X represents the X-coordinate of the non-zero block at the top of the next non-zero data column.

Then, Read Ctrl 23a judges whether X is larger than a read range (S8). In a case in which n1<X is not satisfied (S8—NO), the next non-zero column may be included in the read range, and the process returns to S3.

On the other hand, in a case in which it is judged that the non-zero data column is present (S5—YES), Read Ctrl 23a judges whether the read range is included in the non-zero data column (((X<=n1)&&(X+Num>n0))) (S9). In a case in which the read range is not included therein (S9—NO), the process proceeds to S6. In a case in which the read range includes that (S9—YES), the process proceeds to S10.

In the case in which it is judged that the read range includes that (S9—YES), Read Ctrl 23a judges whether X is in the read range (n0≤X≤n1) (S10). In the case in which X is not in the read range (S10—NO), update to X=X+1 and Num=Num−1 is carried out (S11), and the process returns to S10. On the other hand, if it is judged that X is in the read range (S10—YES), the process proceeds to S12 of FIG. 12.

Read Ctrl 23a outputs a header (S12). This header is start position information of the non-zero data column, and the value of X is output as the header. Then, the non-zero block of S[Y][X] is read (S13), and the read block is output to a read request source (S14). Then, update to X=X+1 and Num=Num−1 is carried out (S15).

Then, Read Ctrl 23a judges whether read of the non-zero data column has been finished (S16). In a case in which it is judged that non-zero data to be read are still remaining (S16—NO), that is, a case of Num>0, Read Ctrl 23a judges whether X is in the read range (n0≤X≤n1) (S17). In a case in which n0≤X≤n1 is satisfied (S17—YES), the process returns to S13.

On the other hand, in a case in which it is judged that no non-zero data to be read are remaining (S16—NO), that is, a case of Num=0, the process proceeds to S18 since the continuous non-zero data columns are once finished. Moreover, also in a case in which it is judged that X is not in the read range (n0≤X≤n1) (S17—NO), the process proceeds to S18. Then, Flag-tail is output (S18), and the process proceeds to S6 of FIG. 11.

In a case in which the next non-zero data column is not present (S6—NO) and in a case in which X is larger than the read range (S8—YES), the process proceeds to S19. Then, Flag-end is output (S19), and the read process is finished.

Herein, a case in which Read Ctrl 23a reads the fourth to eighth block columns of the block row B1 of FIG. 3 (S[1][4] to S[1][8]) will be explained. In the case in which the block columns S[1][4] to S[1][8] are to be read, the matrix data R[1][4] to R[1][8] of FIG. 4 are referenced, wherein m=1, n0=4, and n1=8.

First, when a read request to the fourth to eighth block columns of the first row is input (S1), Read Ctrl 23a sets Y=1 and X=1 (S2).

Read Ctrl 23a reads the non-zero management information R[1][0] of the non-zero management region (S3), and Num=0, Next=1, and Pos=1 are obtained (S4). In the case of the non-zero management region R[1][0], the process proceeds to S6 since no non-zero data is present (Num=0). Because Next=1, Read Ctrl 23a judges that the next non-zero data column is present (S6—YES) and sets X=1+1 (S7). Because X=2<n1=8 (S8—NO), the process returns to S3.

Then, Read Ctrl 23a reads the non-zero management information of R[1][1] (S3). Num=2, Next=4, and Pos=2 are obtained (S4). In this case, non-zero data are present (S5—YES); however, since the range in which the non-zero data are present (R[1][2] to R[1][3]) is not in the read range (S9—NO), the process proceeds to S6. Because Next=4, Read Ctrl 23a judges that the next non-zero data column is present (S6—YES), and X=2+4 is set (S7). Because X=6<n1=8 (S8—NO), the process returns to S3.

Next, Read Ctrl 23a reads the non-zero management information of R[1][5] (S3). Num=2, Next=5, and Pos=6 are obtained (S4). In this case, non-zero data are present (S5—YES), and the range in which the non-zero data are present (R[1][6] to R[1][7]) are included in the read range (S9—YES and S10—YES); therefore, the process proceeds to S12.

Read Ctrl 23a outputs a header (S12) and reads data of S[1][6] from the cache (S13). Then, Read Ctrl 23a outputs the data of S[1][6] to the read request source (S14) and sets X=6+1 and Num=2-1 (S15). Because Num=1, it is judged that non-zero data to be read are still remaining (S16—NO). Moreover, because X=7, X is present in the read range (S17—YES); therefore, the process returns to S13.

Read Ctrl 23a reads the data of S[1][7] and outputs the data to the read request source (S13, S14) and sets X=7+1 and Num=1-1 (S15). Because Num=0, it is judged that no non-zero data to be read are remaining (S16—YES), Read Ctrl 23a outputs Flag-tail (S18), and the process returns to S6.

Because Next=5, it is judged that a non-zero data column is present thereafter (S6—YES), and X=6+5 is set (S7). Because X=11>n1=8 (S8—YES), Read Ctrl 23a outputs Flag-end (S19) and finishes the read process.

Figure 13:
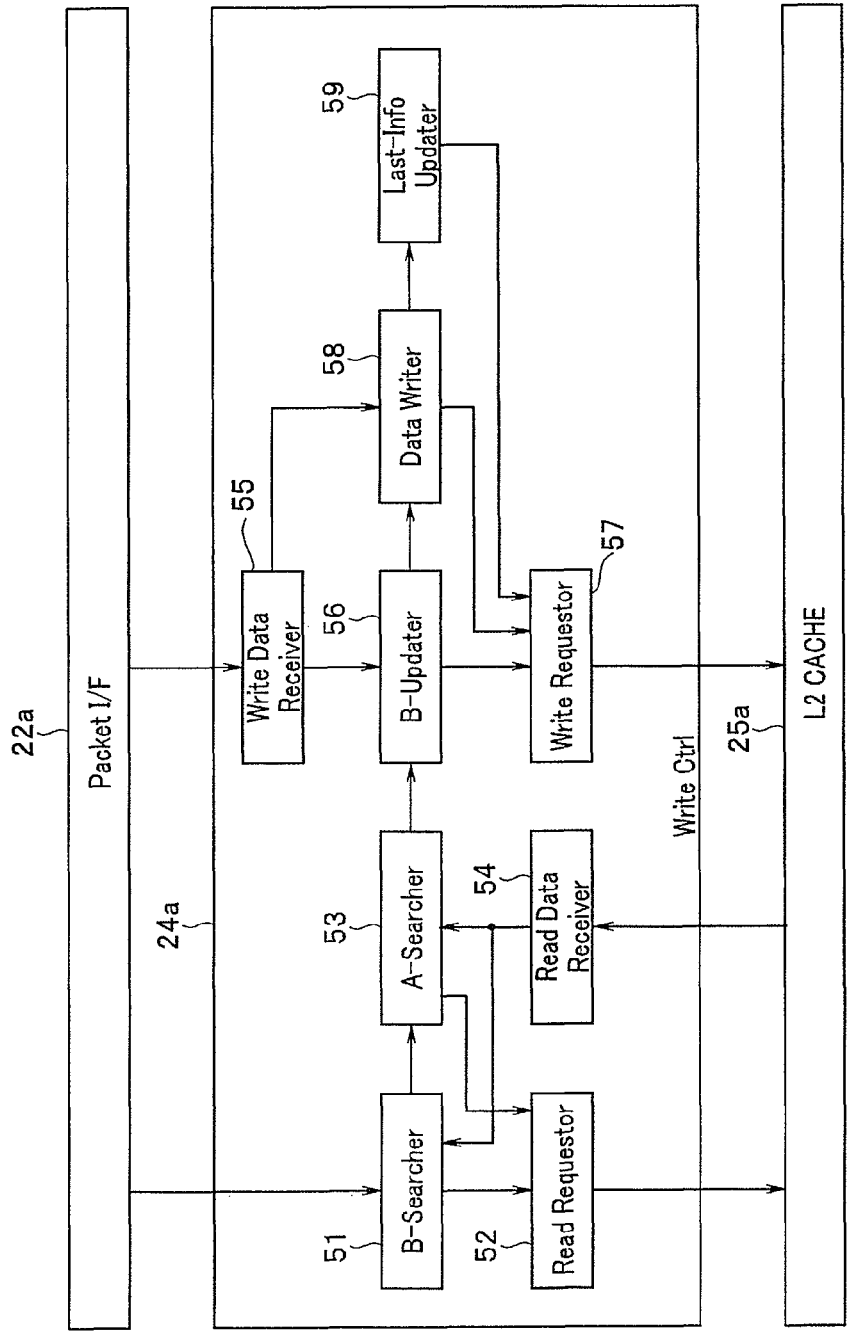

Next, a write operation of Write Ctrl 24 will be explained. Note that, since Write Ctrls 24a to 24d have similar configurations, only Write Ctrl 24a will be explained. FIG. 13 is a configuration diagram of Write Ctrl 24a. Write Ctrl 24a has B-Searcher 51, Read Requestor 52, A-Searcher 53, Read Data Receiver 54, Write Data Receiver 55, B-Updater 56, Write Requestor 57, Data Writer 58, and Last-Info Updater 59.

When a write request is input from Packet I/F 22a, B-Searcher 51 searches for a non-zero data column B.

First, B-Searcher 51 outputs a read request of non-zero management information to Read Requestor 52. In accordance with the read request to the non-zero management information, Read Requestor 52 outputs a read request of a block including the non-zero management information to the L2 cache 25a. In accordance with the read request of the block, read data are read from the L2 cache 25a and input to Read Data Receiver 54. Read Data Receiver 54 reads the non-zero management information from the read data and outputs the information to B-Searcher 51.

When B-Searcher 51 finishes the search for the non-zero data column B using the read non-zero management information, B-Searcher 51 outputs an operation start request to A-Searcher 53 together with the information of the non-zero data column B.

When the information of the non-zero data column B and the operation start request are input, A-Searcher 53 searches for a non-zero data column A. Note that the search for the non-zero data column A will be described later. As well as B-Searcher 51, A-Searcher 53 gives a read request of non-zero management information to Read Requestor 52 and reads the non-zero management information from Read Data Receiver 54.

When the search for the non-zero data column A using the read non-zero management information is finished, A-Searcher 53 outputs a write request to B-Updater 56 together with the information of the non-zero data columns A and B.

In accordance with the input information of the non-zero data columns A and B and the write request, B-Updater 56 carries out update of the non-zero management information of "the start position of the non-zero data column B"-1. In this process, the start position of the non-zero data column is input from Write Data Receiver 55. In the update of the non-zero management information, B-Updater 56 outputs a write request to Write Requestor 57, and Write Requestor 57 outputs a write request of a corresponding block to the L2 cache 25a.

Write data of a non-zero data block and the start position of a non-zero data column are input to Write Data Receiver 55 from Packet I/F 22a. Write Data Receiver 55 outputs the input write data of the non-zero data block and the start position of the non-zero data column to B-Updater 56 and Data Writer 58.

After the update of the non-zero management information at "the start position of the non-zero data column B"-1 is finished, B-Updater 56 outputs an operation start request to Data Writer 58.

When the operation start request is input, Data Writer 58 carries out write of the write data. Data Writer 58 outputs a write request to Write Requestor 57 about write of non-zero data and non-zero management information to Write Requestor 57 as well as B-Updater 56, and Write Requestor 57 outputs a write request of the corresponding block to the L2 cache 25a. After the write of the write data is finished, Data Writer 58 outputs an operation start request to Last-Info Updater 59.

Last-Info Updater 59 carries out write of the last non-zero management information and write of the write data at the position n1 (the last column of the write data, which will be described later). As well as B-Updater 56, Last-Info Updater 59 outputs a write request about write of the non-zero management information to Write Requestor 57, and Write Requestor outputs a write request of the corresponding block to the L2 cache 25a.

Figure 14:
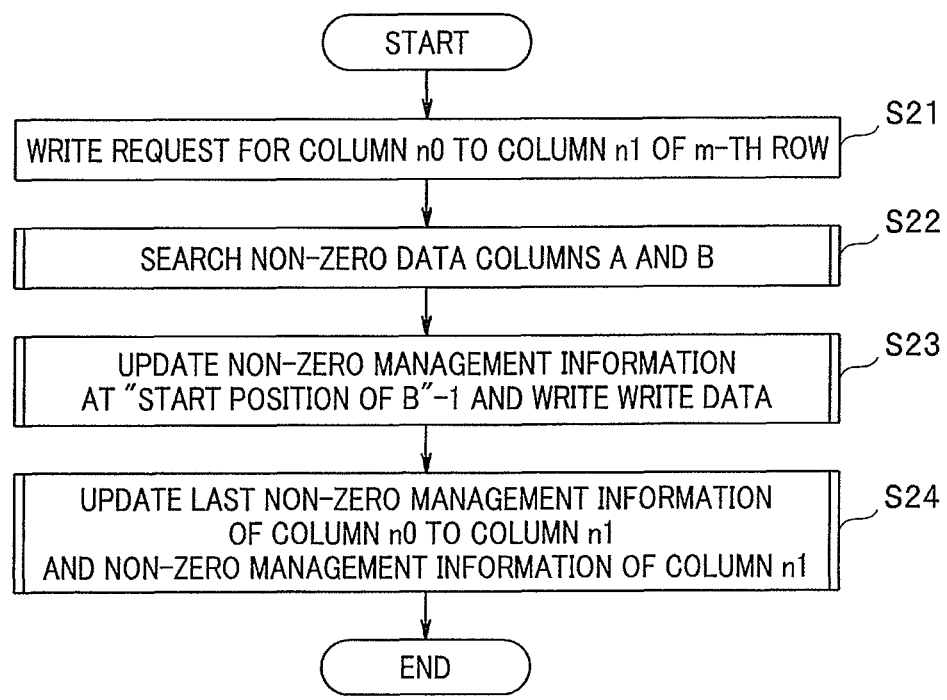
FIG. 14 is a flowchart for explaining an example of the flow of a process of writing data to a block column n0 to a block column n1 of an m-th row.

Herein, an example of the process of a case of a write request will be explained by using FIG. 14. FIG. 14 is a flowchart for explaining the process of writing data to the block column n0 to the block column n1 of the m-th block row.

First, when the write request to the column n0 to the column n1 of the m-th row is input (S21), Write Ctrl 24a searches for non-zero data columns B and A (S22). Herein, the non-zero data column B is a non-zero data column at the top among continuous non-zero data columns started from a position smaller than the region of the column n0 to the column n1. The non-zero data column A is non-zero data column at the ending among continuous non-zero data columns including data at a position larger than the region of the column n0 to the column n1. In a case in which a non-zero data column that satisfies the condition of the non-zero data column B is not present, the start position of the non-zero data column B is assumed to be 1; and, in a case in which a non-zero data column that satisfies the condition of the non-zero data column A is not present, it is assumed that the non-zero data column A is not present.

Then, Write Ctrl 24a carries out update of the non-zero management information at the position of "the start position of the non-zero data column B"-1 and write of write data (S23).

Then, Write Ctrl 24a carries out update of the last non-zero management information of the column n0 to the column n1 and the non-zero management information of the column n1 (S24) and finishes the process.

Figure 15:
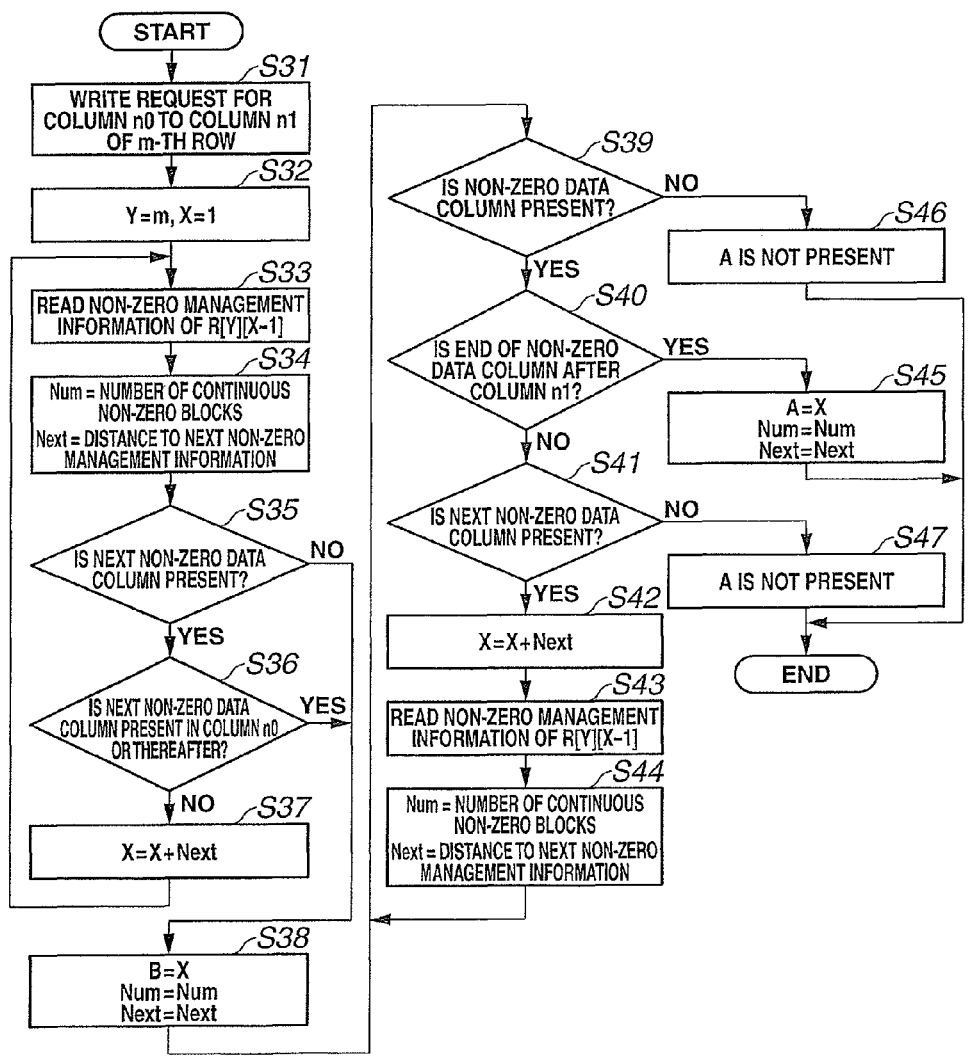
FIG. 15 is a flowchart for explaining an example of the flow of a process of searching for non-zero data columns B and A.

Next, a specific process of S22 will be explained by using FIG. 15. FIG. 15 is a flowchart for explaining the process of search for the non-zero data columns B and A.

First, when the write request to the column n0 to the column n1 of the m-th row is input (S31), Write Ctrl 24a sets Y=m and X=1 (S32). Then, Write Ctrl 24a reads the non-zero management information of R[Y][X-1] (S33). In the process of S33, the non-zero management information at the position immediately before the block represented by X and Y is read. Then, the values of the read non-zero management information are set as Num (the number of continuous non-zero blocks) and Next (the distance to next non-zero management information) (S34).

Write Ctrl 24a judges whether next non-zero data column is present (S35). In a case in which it is judged that the next non-zero data column is present (S35—YES), namely, a case in which Next is not 0, Write Ctrl 24a judges whether the next non-zero data column is the column n0 or thereafter (S36). In a case in which it is judged that a top non-zero block of the next non-zero data column is also at a position less than the column n0 (S36—NO), Write Ctrl 24a updates X to X+Next (S37), and the process returns to S33.

On the other hand, in a case in which it is judged that the next non-zero data column is not present (S35—NO) or in a case in which it is judged that the top non-zero block of the next non-zero data column is in the n0 column or thereafter (S36—YES), Write Ctrl 24a detects a non-zero column starting from X as the non-zero data column B and sets B=X, Num=Num, and Next=Next (S38). As a result of the process of S38, the non-zero data column B and the non-zero management information representing the non-zero data column B are detected.

Then, Write Ctrl 24a judges whether a non-zero data column is present (S39). In a case in which it is judged that the next non-zero data column is present (S39—YES), Write Ctrl 24a judges whether the end of the non-zero data column is after the column n1 (S40). In a case in which it is judged that the end of the non-zero data column is not after the column n1 (S40—NO), Write Ctrl 24a judges whether a next non-zero data column is present (S41). In a case in which it is judged that the next non-zero data column is present (S41—YES), Write Ctrl 24a updates X to X+Next (S42).

Then, Write Ctrl 24a reads the non-zero management information of R[Y] [X-1] (S43) and sets the values of the read non-zero management information as Num and Next (S44). Then, the process returns to S39.

On the other hand, in a case in which it is judged that the end of the non-zero data column is after the column n1 (S40—YES), Write Ctrl 24a detects the non-zero data column starting from X as the non-zero data column A and sets A=X, Num=Num, and Next=Next (S45), and the process is finished. As a result of the process of S45, the non-zero data column A and the management information representing the non-zero data column A are detected.

Note that in a case in which it is judged in S39 that the next non-zero data column is not present (S39—NO), Write Ctrl 24a determines that the non-zero data column A is not present (S46) and finishes the process. Similarly, in a case in which it is determined in S41 that the next non-zero data column is not present (S41—NO), Write Ctrl 24a determines that the non-zero data column A is not present (S47) and finishes the process. As a result of the above process, the start position of the non-zero data column B and the start position of the non-zero data column A are searched.

Figure 16:
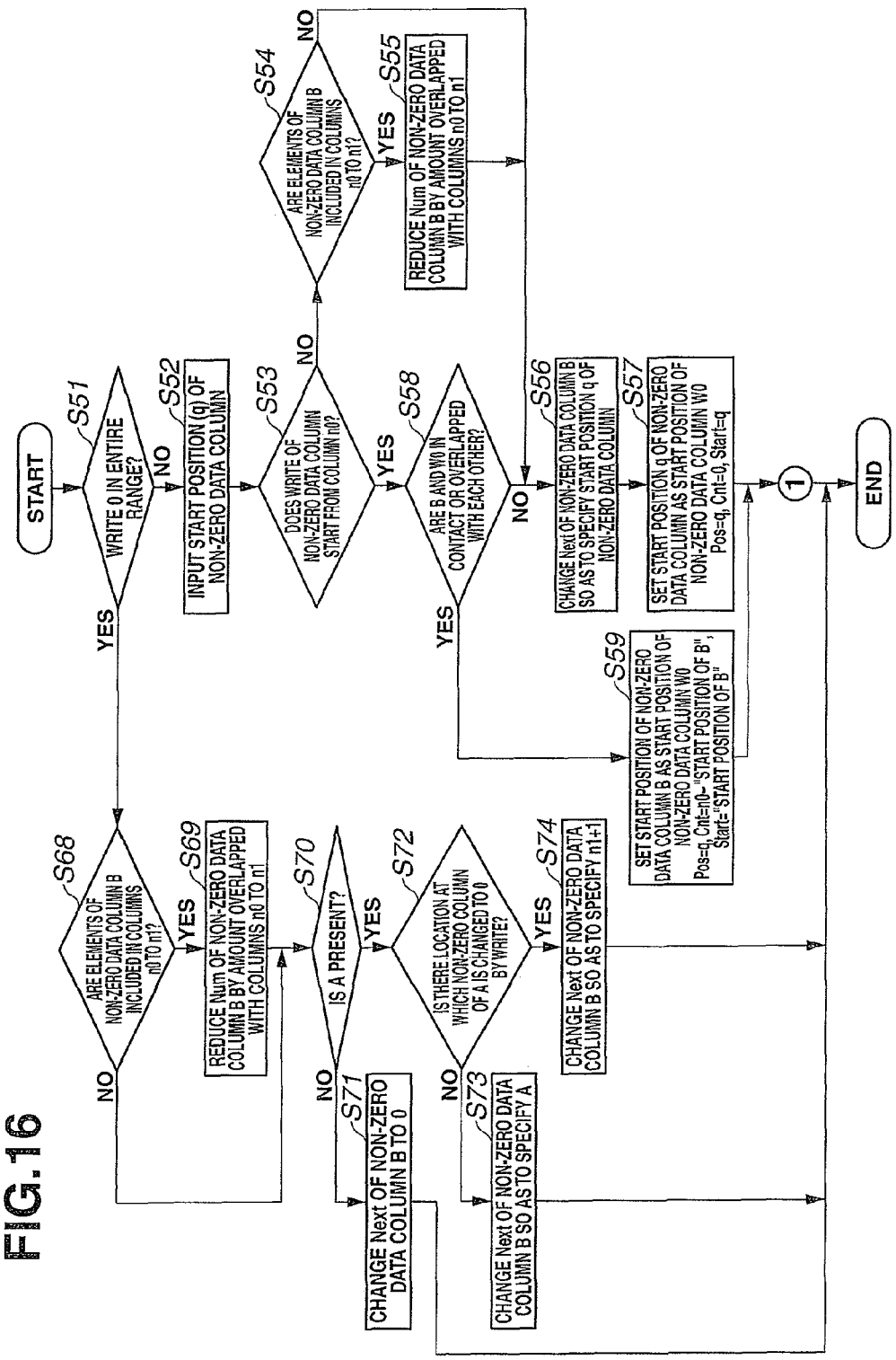
FIG. 16 is a flowchart for explaining an example of the flow of a process of updating non-zero management information at the position of "the start position of the non-zero data column B"−1 and writing write data.
Figure 17:
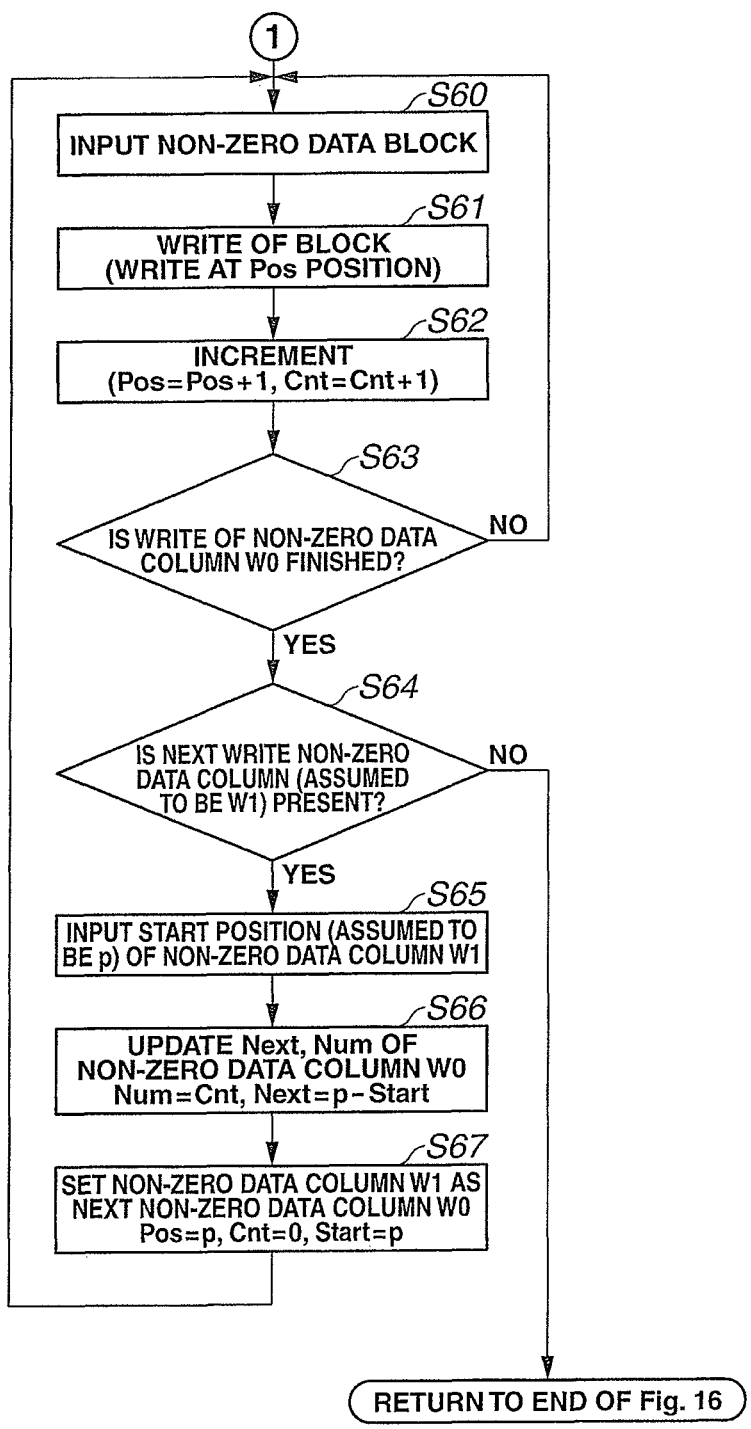
FIG. 17 is a flowchart for explaining an example of the flow of the process of updating the non-zero management information at the position of "the start position of the non-zero data column B"−1 and writing write data.

Next, a specific process of S23 will be explained. FIG. 16 is a flowchart for explaining update of the non-zero management information of the non-zero data column B. FIG. 17 is a flowchart for explaining a write process of write data.

Write Ctrl 24a judges whether the write data in a range are all 0, namely, whether the write data includes non-zero data (S51). In a case in which it is judged that the write data include non-zero data (S51—NO), Write Ctrl 24a inputs a start position (q) of a non-zero data column.

Then, Write Ctrl 24a judges whether the write of the non-zero data column is started from the column n0 (S53). In a case in which it is judged that the write of the non-zero data column is not from the column n0 (S53—NO), Write Ctrl 24a judges that the non-zero data column B is included in the columns n0 to n1 (S54). Namely, in the process of S54, whether the length of the non-zero data column B is changed by zero-data write is checked. In a case in which it is judged that the non-zero data column B is included in the columns n0 to n1 (the length of the non-zero data column B is changed by zero-data write) (S54—YES), Write Ctrl 24a reduces Num of the non-zero data column B by the amount overlapped with the columns n0 to n1 (S55) and changes Next of the non-zero data column B so that it specifies the start position q of the non-zero data column (S56).

Then, Write Ctrl 24a sets the start position q of the non-zero data column as the start position of a non-zero data column W0 (S57). In this case, Write Ctrl 24a sets Pos=q, Cnt=0, and Start=q and proceeds to the process of FIG. 17.

On the other hand, in a case in which it is judged that the write of the non-zero data column is started from the column n0 (S53—YES), Write Ctrl 24a judges whether the non-zero data column B and the non-zero data column W0 are in contact or overlapped with each other (S58). In a case in which it is judged that the non-zero data column B and the non-zero data column W0 are not in contact or not overlapped with each other (S58—NO), the process proceeds to S56. On the other hand, in a case in which it is judged that the non-zero data column B and the non-zero data column W0 are in contact or overlapped with each other (S58—YES), Write Ctrl 24a sets the start position of the non-zero data column B as the start position of the non-zero data column W0 (S59). In this case, Write Ctrl 24a sets Pos=q, Cnt=n0–"the start position of B", and Start=the start position of B, and the process proceeds to the process of FIG. 17.

When the process of S57 or S59 is executed, a transition to FIG. 17 is made, and Write Ctrl 24a inputs a non-zero data block (S60) and writes the input non-zero data block at the position of S[m][Pos] (S61). Then, Write Ctrl 24a increments Pos and Cnt (Pos=Pos+1, Cnt=Cnt+1) (S62) and judges whether the write of the non-zero data column W0 has been finished (S63). In a case in which it is judged that the write of the non-zero data column W0 has not been finished (S63—NO), the process returns to S60. On the other hand, in a case in which it is judged that the write of the non-zero data column W0 has been finished (S63—YES), Write Ctrl 24a judges whether a next write non-zero data column (assumed to be W1) is present (S64). In a case in which it is judged that the next write non-zero data column W1 is present (S64—YES), Write Ctrl 24a inputs the start position (herein, assumed to be p) of the next non-zero data column W1 (S65).

Then, Write Ctrl 24a updates Num and Next of the non-zero data column W0 (S66). In this case, Write Ctrl 24a sets Num=Cnt and Next=p-Start. Then, Write Ctrl 24a sets the non-zero data column W1 as the next non-zero data column W0 (S67), and the process returns to S60. In this case, Write Ctrl 24a sets Pos=p, Cnt=0, and Start=p. On the other hand, in a case in which it is judged that the next write non-zero data column W1 is not present (S64—NO), the process returns to the end of FIG. 16.

Moreover, in a case in which it is judged that no non-zero data is included in the write data (all of write data in the range are 0) (S51—YES), Write Ctrl 24a judges whether the elements of the non-zero data column B are included in the columns n0 to n1 (S68). In a case in which it is judged that the non-zero data column B is not included in the columns n0 to n1 (S68—NO), the process proceeds to S70. On the other hand, in a case in which it is judged that the non-zero data column B is included in the columns n0 to n1, Write Ctrl 24a reduces Num of the non-zero data column B by the amount overlapped with the columns n0 to n1 (S69).

Then, Write Ctrl 24a judges whether the non-zero data column A is present (S70). In a case in which it is judged that the non-zero data column A is not present (S70—NO), Write Ctrl 24a changes Next of the non-zero data column B to 0 (S71), and the process is finished. On the other hand, in a case in which it is judged that the non-zero data column A is present (S70—YES), Write Ctrl 24a judges whether there is a location where the non-zero column of the non-zero data column A is changed to 0 by write (S72). In a case in which it is judged that there is no location where the non-zero column of the non-zero data column A is changed by the write (S72—NO), Write Ctrl 24a changes Next of the non-zero data column B so that it specifies the non-zero data column A (S73), and the process is finished. On the other hand, in a case in which it is judged that there is the location where the non-zero column of the non-zero data column A is changed to 0 by the write (S72—YES), Write Ctrl 24a changes Next of the non-zero data column B so that it specifies n1+1 (S74), and the process is finished.

Figure 18:
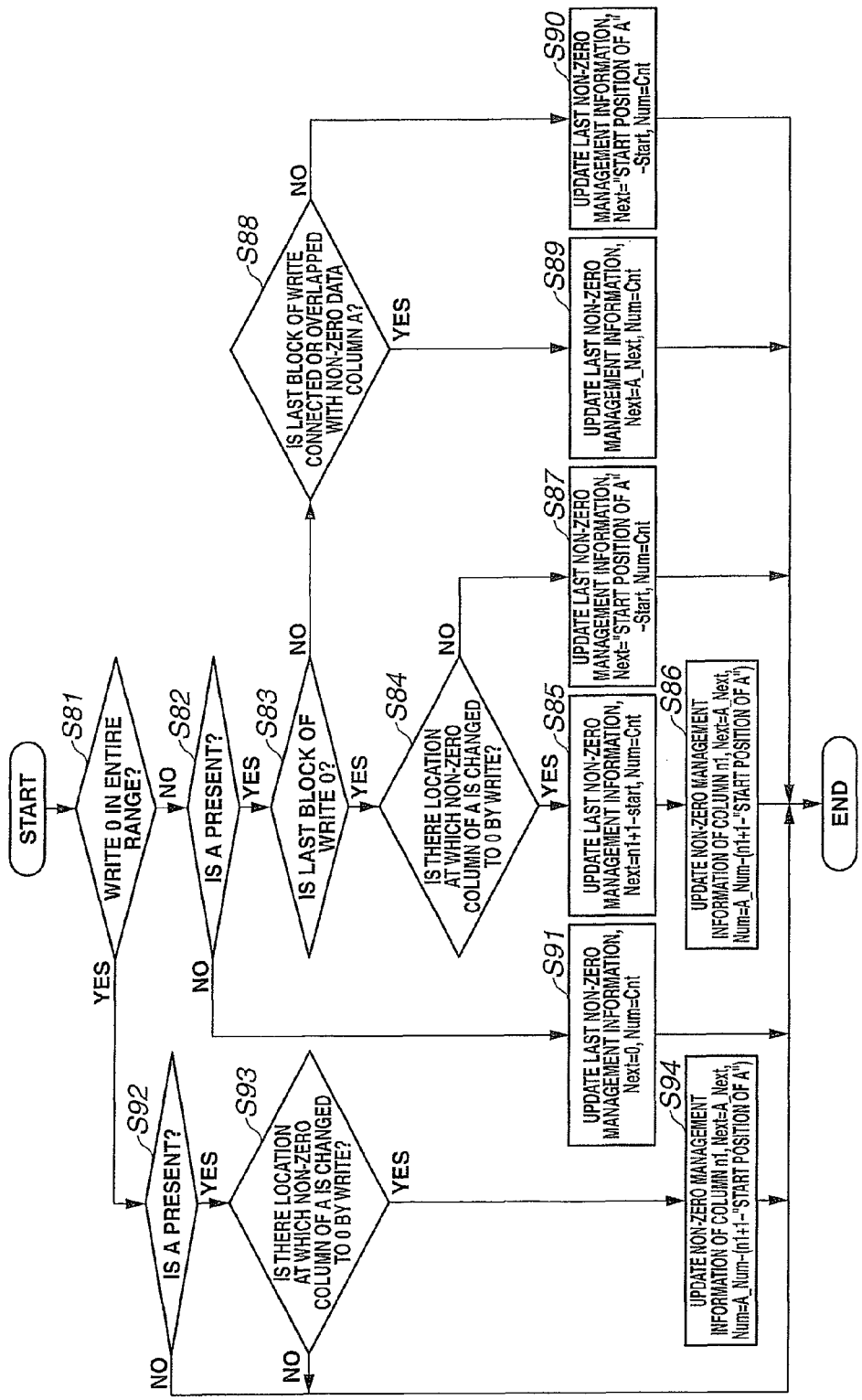
FIG. 18 is a flowchart for explaining an example of the flow of the process of updating last non-zero management information and updating non-zero management information of the column n1.

FIG. 18 is a flowchart for explaining a process of updating the last non-zero management information and updating the non-zero management information of the column n1.

First, Write Ctrl 24a judges whether 0 is written in all the write range (S81). In a case in which it is judged that 0 is not written in all the write range (S81—NO), Write Ctrl 24a judges whether the non-zero data column A is present (S82). In a case in which it is judged that the non-zero data column A is present (S82—YES), Write Ctrl 24a judges whether the last block of write is 0 (S83).

In a case in which it is judged that the last block of the write is 0 (S83—YES), Write Ctrl 24a judges whether there is the location where the non-zero column of the non-zero data column A is changed to 0 by the write (S84). In a case in which it is judged that there is the location where the non-zero column of the non-zero data column A is changed to 0 by the write (S84—YES), Write Ctrl 24a updates the last non-zero management information (S85). In this case, Write Ctrl 24a sets Next=n1+1-Start and Num=Cnt. Finally, Write Ctrl 24a updates the non-zero management information of the column n1 (S86), and the process is finished. In this case, Write Ctrl 24a sets Next=A_Next and Num=A_Num−(n1+1−"the start position of A").

On the other hand, in a case in which it is judged that there is no location where the non-zero column of the non-zero data column A is changed to 0 by the write (S84—NO), Write Ctrl 24a updates the last non-zero management information to Next="the start position of A"-Start and Num=Cnt (S87), and the process is finished.

Moreover, in a case in which it is judged that the last block of the write is not 0 (S83—NO), Write Ctrl 24a judges whether the last block of the write is connected or overlapped with the non-zero data column A (S88). In a case in which it is judged that the last block of the write is connected or overlapped with the non-zero data column A (S88—YES), Write Ctrl 24a updates the last non-zero management information to Next=A_Next and Num=Cnt (S89), and the process is finished. On the other hand, in a case in which it is judged that the last block of the write is not connected nor overlapped with the non-zero data column A (S88—NO), Write Ctrl 24a updates the last non-zero management information to Next="the start position of A"−Start and Num=Cnt (S90), and the process is finished.

Moreover, in a case in which it is judged that the non-zero data column A is not present (S82—NO), Write Ctrl 24a updates the last non-zero management information to Next=0 and Num=Cnt (S91), and the process is finished.

Moreover, in a case in which it is judged that 0 is written in all the write range (S81—YES), Write Ctrl 24a judges whether the non-zero data column A is present (S92). In a case in which it is judged that the non-zero data column A is not present (S92—NO), the process is finished. On the other hand, in a case in which it is judged that the non-zero data column A is present (S92—YES), Write Ctrl 24a judges whether there is the location where the non-zero column of the non-zero data column A is changed to 0 by the write (S93). In a case in which it is judged that there is no location where the non-zero column of the non-zero data column A is changed to 0 by the write (S93—NO), the process is finished. On the other hand, in a case in which it is judged that there is the location where the non-zero column of the non-zero data column A is changed to 0 by the write (S93—YES), Write Ctrl 24a updates the non-zero management information of the column n1 to Next=A_Next and Num=A_Num−(n1+1−"the start position of A") (S94), and the process is finished.

Figure 19:
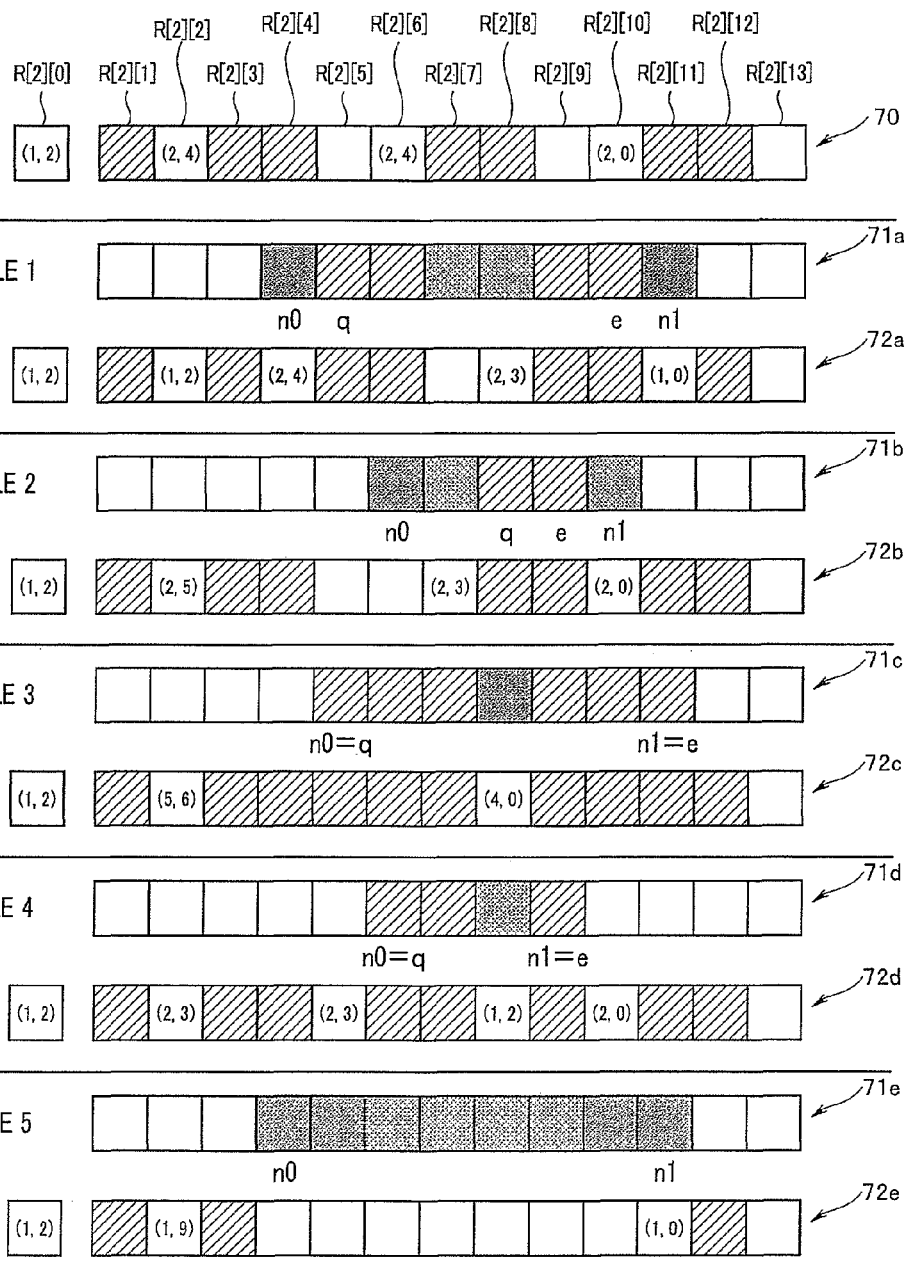
Figure 20:
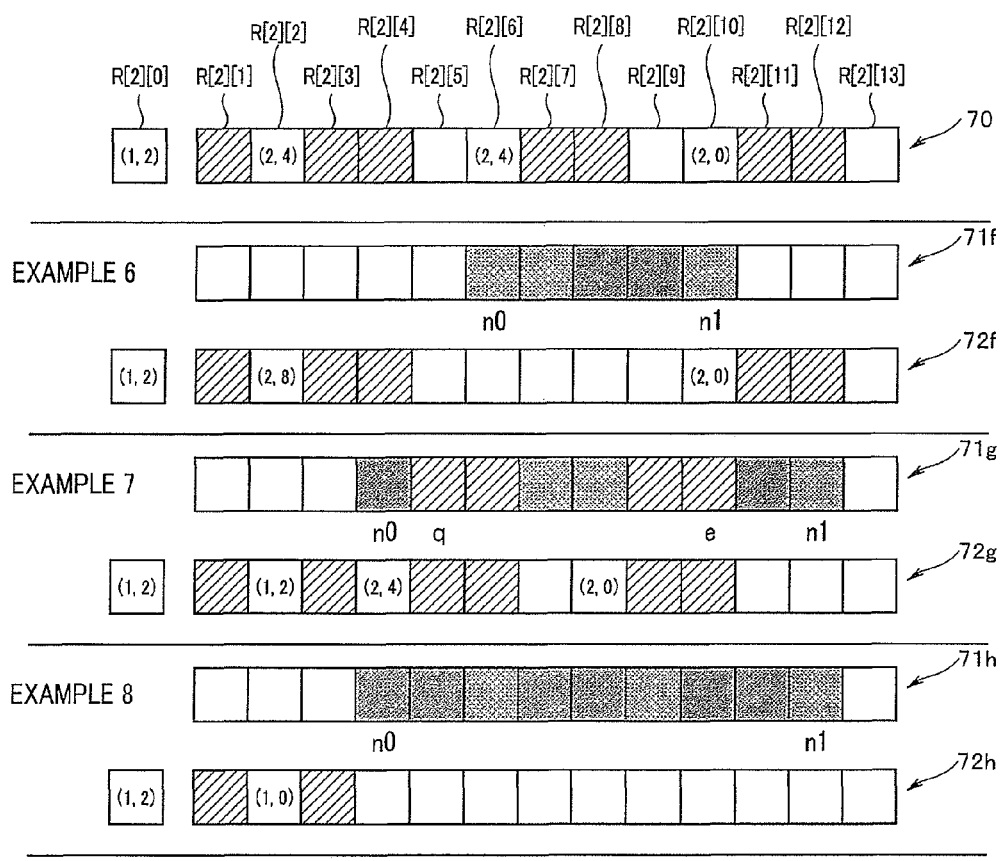

Next, an example of writing data to the block row B2 of the second row (m=2) of the sparse matrix S shown in FIG. 3 will be explained by using FIG. 19 and FIG. 20. FIG. 19 and FIG. 20 are diagrams showing data columns to be written and non-zero management information of the second row.

In FIG. 19, a reference sign 70 represents the data of the block row B2 of the second row of the sparse matrix S before data are written. At reference signs 71a to 71h, hatched squares represent non-zero data, gray squares represent zero data, and white squares represent that write is not carried out therein. Reference signs 72a to 72h represent the data of the block row B2 after write data (reference signs 71a to 71h) of Example 1 to Example 8 are written. First, the search process of the non-zero data columns B and A of S22 will be explained by using Example 1 of FIG. 19. In Example 1, write of data is carried out from fourth to eleventh columns (n0=4, n1=11), non-zero data are written to fifth, sixth, ninth, and tenth columns, and zero data are written to fourth, seventh, eighth, and eleventh columns.

In the search for the non-zero data column B, first, Write Ctrl 24a reads the non-zero management information R[2]

[0] at the top. Write Ctrl 24a obtains the start position of a next non-zero column from the read value (Next). In the case of Example 1, it is R[2][3].

Then, Write Ctrl 24a checks whether the obtained start position of the non-zero column is in the range of write data (R[2][4] to R[2][11]). In the case in which the obtained start position of the non-zero column is in the range of the write data, "the position of the read non-zero management information"+1 is the start position of the non-zero data column B. In a case in which the start position is not in the range, next non-zero management information is read. In the case of Example 1, since R[2] [3] is not in the range of the write data, the next non-zero management information R[2] [2] is read.

Thereafter, Write Ctrl 24a carries out a similar process until the non-zero data column B is detected. In the case of Example 1, if the start position of the next non-zero column becomes R[2] [7], the start position of the non-zero data column B becomes "the position of the non-zero management information R[2][2]"+1, namely, 3.

On the other hand, in the search for the non-zero data column A, first, Write Ctrl 24a initializes the position of the non-zero management information to the position of "the start position of the non-zero data column B"-1. Then, the non-zero management information is read from the position of the current non-zero management information, and the last position of the non-zero data column is obtained from "the position of the current non-zero management information"+Num. In the case of Example 1, R[2][4] is obtained from 2+2=4.

Then, Write Ctrl 24a checks whether the last position of the obtained non-zero data column is in the range of the write data (R[2][4] to R[2][11]). In a case in which the last position of the obtained non-zero data column is not in the range of the write data, "the position of the current non-zero management information"+1 becomes the start position of the non-zero data column A. In this case, since R[2][4] is in the range of the write data, Write Ctrl 24a updates the position of the non-zero management information to the position (6) of the next non-zero management information R[2][6].

Thereafter, Write Ctrl 24a carries out a similar process until the non-zero data column A is detected. Herein, in a case in which the next non-zero management information is not present, the non-zero data column A is not present. In the case of Example 1, if the last position of the non-zero data column of the non-zero management information R[2][10] is R[2][12], it is not in the range of the write data; therefore, the start position of the non-zero data column A becomes "the position of the non-zero management information R[2][10]"+1, namely, 11. In the case of Example 7 and Example 8 of FIG. 20, R[2][12] is in the range of the write data, and the next non-zero data column thereof is not present; therefore, the non-zero data column A is not present.

Next, the process of searching for the non-zero data columns B and A in a case in which the data of Example 1 of FIG. 19 are written will be explained by using FIG. 15.

First, when a write request to the fourth column to eleventh column of the second row is input (S31), Write Ctrl 24a carries out substitution of Y=2 and X=1 (S32) and reads the non-zero management information of R[2][0] (S33). Then, Write Ctrl 24a sets Num=1 and Next=2 as the values of the read non-zero management information (S34).

Then, Write Ctrl 24a judges that the next non-zero column is present since Next is not 0 (S35—YES). Furthermore, ((X+Next)≥4) is not satisfied since X+Next=3, and Write Ctrl 24a judges that the top non-zero block of the next non-zero data column is also at a position less than the fourth column (S36—NO). Write Ctrl 24a updates X to 3 (=I+2) (S37), and the process returns to S33. The updated X (=3) represents the X-coordinate of the top non-zero block of the next non-zero data column.

Write Ctrl 24a reads the non-zero management information of R[2][2] (S33) and sets Num=2 and Next=4 (S34). Write Ctrl 24a judges that the next non-zero data column is present since Next is not 0 (S35—YES). Furthermore, since ((X+Next)≥4) is satisfied, Write Ctrl 24a judges that the top non-zero block of the next non-zero data column is at a column of the fourth column or thereafter (S36—YES). Thus, Write Ctrl 24a sets the non-zero data column starting from X=3 as the non-zero data column B and sets B=X=3, Num=2, and Next=4 (S38).

Then, Write Ctrl 24a judges that the next non-zero data column is present because Num=2 (S39—YES). Furthermore, ((X+Num−1)>11) is not satisfied because X+Num−1=4, Write Ctrl 24a judges that the non-zero data column at the ending is before the eleventh column (S40—NO).

Then, Write Ctrl 24a judges that the next non-zero data column is present since Next is 4 (S41—YES) and updates X to 7 (=3+4) (S42). This updated X (=7) represents the X-coordinate of the top non-zero block of the next non-zero data column.

Then, Write Ctrl 24a reads the non-zero management information of R[2] [6] (S43) and sets Num=2 and Next=4 (S44), and the process returns to S39.

Write Ctrl 24a judges that the next non-zero data column is present because Num=2 (S39—YES). Because X+Num−1=8, ((X+Num−1)>11) is not satisfied, and Write Ctrl 24a judges that the non-zero data column at the ending is before the eleventh column (S40—NO). Moreover, since Next is 4, Write Ctrl 24a judges that the next non-zero data column is present (S41—YES) and updates X to 11 (=7+4) (S42). Then, Write Ctrl 24a reads the non-zero management information of R[2][10] (S43) and sets Num=2 and Next=0 (S44), and the process returns to S39.

In this case, Write Ctrl 24a judges that the next non-zero data column is present because Num=2 (S39—YES) and judges that ((X+Num−1)>11) is satisfied because X+Num−1=12 (S40—YES). Write Ctrl 24a sets the non-zero data column that starts from X=11 as the non-zero data column A. As a result of the above process, the start position of the non-zero data column B is searched as 3, and the start position of the non-zero data column A is searched as 11.

Next, update of the non-zero management information at the position of "the start position of the non-zero data column B"-1 will be explained by using Example 1 to Example 8 of FIG. 19 and FIG. 20. In all of the eight examples, R[2][3] is the start position of the non-zero data column B. Moreover, the write range is from the column n0 to the column n1, a non-zero data column at the top in the write data is C, and the start position of C is q.

In Example 1 of FIG. 19 and Example 7 of FIG. 20, write is started from zero data (R[2][n0] is 0, n0≠q), and, as a result of write of the zero data, the length of the non-zero data columns is reduced. Therefore, Num of the non-zero management information R[2] [2] is changed from 2 to 1 (becomes n0−B). Moreover, Next of the non-zero management information R[2] [2] is changed so as to specify the start position q of the non-zero data column C (4→2).

Moreover, in Example 2 of FIG. 19, write is started from zero data (R[2] [n0] is 0, n0≠q), and, as a result of write of the zero data, the length of the non-zero data columns is not changed. Therefore, only Next of the non-zero management information R[2] [2] is changed so as to specify q of the start position of the non-zero data column of C (4→5).

Moreover, in Example 3 of FIG. 19, write is started from non-zero data (R[2][n0] is non-zero, n0=q), and, as a result of non-zero write, the length of the non-zero data columns is changed. Therefore, Num of the non-zero management information R[2][2] is changed from 2 to 5 ("the number of non-zero data of C"+q−"the start position of B"). Moreover, Next of the non-zero management information R[2] [2] is changed so as to specify the start position of the further next non-zero data column of C (4→6).

Moreover, in Example 4 of FIG. 19, write is started from non-zero data (R[2][n0] is non-zero, n0=q), and, as a result of write of the non-zero data, the length of the non-zero data columns is not changed. Therefore, only Next of the non-zero management information R[2] [2] is changed so as to specify q of the start position of the non-zero data column of C (4→3).

Moreover, in Example 5 of FIG. 19, all write is zero data, and, as a result of write of the zero data, the length of the non-zero data columns is reduced. Therefore, Num of the non-zero management information R[2] [2] is reduced from 2 to 1 (changed to n0−"the start position of B"). Furthermore, as a result of write of the zero data, the length of the data column of the non-zero data column A is reduced. Therefore, Next of the non-zero management information R[2] [2] is changed so as to specify n1+1 (4→11).

Moreover, in Example 6 of FIG. 20, all write is zero data, and, as a result of write of the zero data, the length of the non-zero data columns is not changed. Therefore, Num of the non-zero management information R[2] [2] is not changed. Furthermore, as a result of write of the zero data, the length of the data column of the non-zero data column A is not changed. Therefore, Next of the non-zero management information R[2] [2] is changed so as to specify the start position of the non-zero data column A (4→8).

Moreover, in Example 8 of FIG. 20, all write is zero data, and, as a result of write of the zero data, the length of non-zero data columns is reduced. Thus, Num of the non-zero management information R[2] [2] is reduced from 2 to 1 (changed to n0−"the start position of B"). Furthermore, since the non-zero data column A is not present, Next of the non-zero management information R[2][2] is changed to 0.

Next, a write process of write data will be explained by using Example 1 of FIG. 19. The write of the write data is carried out in a case in which the write data include non-zero data.

First, in Example 1 of FIG. 19, the start position (X=5) of write non-zero data is input, two non-zero data blocks are input, and the non-zero data are written to X=5, 6 (S[2][5], S[2][6]). Then, the start position (X=9) of the write non-zero data is input. Thus, the non-zero management information at the position of X=4 (R[2][4]) is defined; therefore, Num=2 and Next=9−5=4 are written at the position of X=4 (S[2][4]). Then, two non-zero data blocks are input, and the non-zero data are written to S[2] [9] and S[2][10], and the write is finished. Update of the non-zero management information at the position of X=8 is carried out in next S24. In this manner, write of non-zero data column(s) and write of non-zero management information are repeatedly carried out. The non-zero management information is not read during the operation.

Example 2 to Example 4 of FIG. 19 are also similar. However, in the case of Example 3, the non-zero management information updated first is at the position "the start position of the non-zero data column B"−1 (R[2] [2]).

Herein, a process of updating the non-zero management information at the position of "the start position of the non-zero data column B"−1 and writing write data of the case in which the data of Example 1 of FIG. 19 are written by Write Ctrl 24*a* will be explained by using FIG. 16 and FIG. 17.

First, since the write data include non-zero data (S51—NO), Write Ctrl 24*a* inputs the start position (q=5) of the non-zero data column (S52). Then, because q=5 and n0=4, q≠n0 is obtained (S53—NO), and it is started from zero data. Then, according to "the start position of the non-zero data column B"=3 and B_Num=2, ("the start position of B"+B_Num−1)≥n0 is satisfied, and elements of the non-zero data column B are included in the columns n0 to n1 (S54—YES).

Then, Write Ctrl 24*a* updates the non-zero management information R[2][2] at the position of "the start position of the non-zero data column B"−1 to Num=1 and Next=2 (S55, S56).

Then, Write Ctrl 24*a* sets the start position q of the non-zero data column as the start position of the non-zero data columns W0 and sets Pos=q=5, Cnt=0, and Start=q=5 (S57).

Then, Write Ctrl 24*a* inputs a non-zero data block (S60) and writes the input non-zero data block to S[2][5] (S61). Then, Write Ctrl 24*a* increments Pos and Cnt (Pos=Pos+1=6, Cnt=Cnt+1=1) (S62). Since write of the non-zero data columns W0 has not been finished (S63—NO), the process returns to S60.

Then, Write Ctrl 24*a* inputs a non-zero data block (S60) and writes the input non-zero data block to S[2][6] (S61). Then, Write Ctrl 24*a* carries out increment to Pos=7 and Cnt=2 (S62) and judges that write of the non-zero data columns W0 has been finished (S63—YES).

Then, since the next write non-zero data columns W1 are present (S64—YES), Write Ctrl 24*a* inputs the start position (p=9) of the next non-zero data columns (S65).

Then, Write Ctrl 24*a* sets Num=Cnt=2 and Next=p−Start=9−5=4 (S66). Then, Write Ctrl 24*a* sets the non-zero data columns W1 as the next non-zero data columns W0 (S67), and the process returns to S60. In this case, Pos=p=9, Cnt=0, and Start=p=9 are set.

Then, Write Ctrl 24*a* inputs a non-zero data block (S60) and writes the input non-zero data block to S[2][9] (S61). Then, Write Ctrl 24*a* carries out increment to Pos=10 and Cnt=1 (S62), and, since write of the non-zero data columns W0 has not been finished (S63—NO), the process returns to S60.

Then, Write Ctrl 24*a* inputs a non-zero data block (S60) and writes the input non-zero data block to S[2][10] (S61). Then, Write Ctrl 24*a* carries out increment to Pos=11 and Cnt=2 (S62). The write of the non-zero data columns W0 has been finished (S63—YES), and the next write non-zero data column W1 is not present (S64—NO); therefore, Write Ctrl 24*a* returns to END of FIG. 16.

Then, a process of updating the last non-zero management information in the write data and updating the non-zero management information of the column n1 will be explained. In all of Example 1 to Example 6 of FIG. 19 and FIG. 20, R[2][11] is the start position of the non-zero data column A. In Example 7 and Example 8, the non-zero data column A is not present. The write range is the columns n0 to n1, and the column number at the largest position in the non-zero data in the write data is e.

In Example 1 of FIG. 19, write is finished with zero data (R[2][n1]=0, n1≠e), and, as a result of write of the zero data, the length of the data columns of the non-zero data, columns A is reduced. Therefore, the last non-zero management information R[2] [8] is changed so that Num specifies 2 (remains at the number of the written data columns) and Next specifies n1+1−Start (11+1−9=3). Moreover, the non-zero management information R[2][11] of the column n1 is changed so that Num is reduced by the amount of reduction from Num (2) of the non-zero data columns A by the zero write (2→1) and Next becomes the same as Next of the non-zero data column A.

Moreover, in Example 2 of FIG. 19, e=9, wherein write is finished with zero data (R[2][n1]=0, n1≠e), and, as a result of the write of the zero data, the length of the data columns of the non-zero data columns A is not reduced. Therefore, the last non-zero management information R[2][7] is changed so that Num is 2 (remains at the number of written data columns) and Next specifies "the start position of the non-zero data columns A"−Start (11−8=3).

Moreover, in Example 3 of FIG. 19, write is finished with non-zero data (R[2][n1]≠0, n1=e), and, as a result of the write of the non-zero data, the last non-zero data column and the non-zero data column A are connected or overlapped with each other. Therefore, the last non-zero management information R[2][8] is changed so that Num specifies 4 ("the number (3) of written data columns"+"the number of block (s) (1) which is in the non-zero data column A and outside the write range") and Next specifies Next (0) of the non-zero data column A.

Moreover, in Example 4 of FIG. 19, e=9, wherein write is finished with non-zero data (R[2][n1]≠0, n1=e), and, as a result of the write of the non-zero data, the length of the data columns of the non-zero data columns A is not changed. Therefore, the last non-zero management information R[2] [8] is changed so that Num specifies 1 (remains at the number of the written data column) and Next specifies "the start position of the non-zero data column A"−Start (11−9=2). If A is not present, Next is changed to 0.

Moreover, in Example 5 of FIG. 19, since non-zero data write is not present, write is finished with zero data (R[2][n1]=0), and, as a result of the write of the zero data, the length of the data columns of the non-zero data columns A is reduced. Therefore, the non-zero management information R[2][11] of the column n1 is changed so that Num is reduced from Num (2) of the non-zero data columns A by the amount reduced by the write of the zero data (2→1) and Next becomes the same as Next of the non-zero data columns A.

Moreover, in Example 6 of FIG. 20, since non-zero data write is not present, write is finished with zero data (R[2][n1]=0), and, as a result of the write of the zero data, the length of the data columns of the non-zero data columns A is not reduced. Therefore, the last non-zero management information and the non-zero management information of the column n1 is not changed.

Moreover, in Example 7 of FIG. 20, e=10 and n1=12, wherein write is finished with zero data (R[2][n1] is 0, n1≠e), and the non-zero data column A is not present. Therefore, Num is 2 (remains at the number of the written data columns), and Next is changed to 0.

Moreover, in Example 8 of FIG. 20, since non-zero data write is not present, the write is finished with zero data (R[2][n1]=0), and the non-zero data column A is not present. Therefore, the last non-zero management information and the non-zero management information of the column n1 is not changed.

Next, a process of updating the last non-zero management information and updating the non-zero management information of the column n1 in a case in which the data of Example 1 of FIG. 19 are written will be explained by using FIG. 18.

It is assumed that Pos=11, Cnt=2, and Start=9 are set by the process of FIG. 16 and FIG. 17. First, it is not the write of 0 in all the write range (S81—NO), the non-zero data columns A are present (S82—YES), Pos=11, and Pos−1≠n1 is satisfied; therefore, Write Ctrl 24a judges that the last write data is 0 (S83—YES).

Then, A≤n1 is satisfied according to "the start position of the non-zero data columns A"=11 (S84—YES), and Write Ctrl 24a updates the last non-zero management information and sets Next=n1+1−Start=11+1−9=3 and Num=Cnt=2 (S85).

Finally, Write Ctrl 24a updates the non-zero management information of the column n1 (S86) and finishes the process. In this case, Next=A_Next=0, Num=A_Num−(n1+1−"the start position of A")=2−(11+1−11)=1. As a result of the above process, the non-zero management information R[2] [11] of the column n1 is updated to Num=1 and Next=0.

As described above, the matrix management engine 4 is configured to retain only the non-zero data in the L2 caches 25a to 25d and store the non-zero management information representing the number of the continuous non-zero data in the region of zero data and the distance to the next non-zero data. Moreover, when a read request is input, the matrix management engine 4 is configured to reference the non-zero management information and return only the non-zero data to the request source. As a result, the used amount of the L2 caches 25a to 25d is configured to be reduced by retaining only the non-zero data, and a band width is configured to be reduced by transferring only the non-zero data.

Therefore, according to the matrix management engine as the information processing device of the present embodiment, the memory used amount and the band width can be suppressed by retaining/managing only the non-zero data in the cache memories.

Note that the processes in the flowcharts of the present specification may be executed in a changed order, a plurality of them may be simultaneously executed, or the processes may be executed in a different order in every execution unless they are not against the properties thereof.

While certain embodiments have been described, these embodiments have been presented by way of example only, and are not intended to limit the scope of the inventions. Indeed, the novel apparatuses, methods and circuits described herein may be embodied in a variety of other forms; furthermore, various omissions, substitutions and changes in the form of the apparatuses, methods and circuits described herein may be made without departing from the spirit of the inventions. The accompanying claims and their equivalents are intended to cover such forms or modifications as would fall within the scope and spirit of the inventions.

What is claimed is:

1. An information processing device comprising:
an input unit to which a read request and a write request are input, the read request and the write request for a predetermined range of a block row provided with at least one or more blocks consisting of one or more elements;
a storage unit that stores, at a corresponding positon in a layout of the block row, non-zero data having one or more non-zero elements in one block, and in a region of zero data having all elements in one block being zero and arranged immediately before the non-zero data, management information storing information representing a number of continuous non-zero data and a distance to next non-zero data;

a read control unit configured to when the read request is input, read data including the management information from the storage unit, reference the management information, and output only the non-zero data included in the predetermined range of the block row; and a write control unit configured to when the write request is input, write in the storage unit at the stored corresponding position in the layout of the block row only the non-zero data having the one or more non-zero elements in one block of the data and update the management information immediately before a start position of the continuous non-zero data, a last management information stored in the predetermined range, and the last management information of the predetermined range.

2. The information processing device according to claim 1, wherein, when the read request is input, the read control unit reads the management information from the storage unit and confirms the read management information.

3. The information processing device according to claim 2, wherein the read control unit outputs a read request of a block including the management information to the storage unit in accordance with a read request of the management information.

4. The information processing device according to claim 3, wherein the read control unit reads the management information from the read data and detects non-zero data of a read target in accordance with the management information.

5. The information processing device according to claim 4, wherein, when a read request of blocks in which the detected non-zero data is continuous is finished, the read control unit outputs an end flag.

6. The information processing device according to claim 5, wherein, when read of all the non-zero data included in the predetermined range is finished, the read control unit outputs a non-zero data flag.

7. The information processing device according to claim 1, wherein, the write request is input, the write control unit reads a block including the management information from the storage unit.

8. The information processing device according to claim 7, wherein the write control unit searches for the start position of the continuous non-zero data using the read management information.

9. The information processing device according to claim 7, wherein the write control unit updates the management information immediately before the searched start position of the continuous non-zero data, and thereafter writes the non-zero data into the storage unit.

10. The information processing device according to claim 9, wherein the write control unit writes the non-zero data into the storage unit, and thereafter updates the last management information stored in the predetermined range, and the last management information of the predetermined range.

11. The information processing device according to claim 1, wherein
a management region that stores the management information is provided separately from the block row, and
management information about data from a row head of the block row is stored in the management region.

12. The information processing device according to claim 1, wherein
management information is stored in the region of the zero data immediately before the continuous non-zero data.

13. The information processing device according to claim 1, wherein
a plurality of pieces of the management information are stored in the region of the zero data immediately before the continuous non-zero data.

14. The information processing device according to claim 11, wherein
the management region is a storage region corresponding to one block.

15. The information processing device according to claim 1, wherein
the storage unit is a cache memory or a DRAM.

* * * * *